(12) United States Patent
Roy et al.

(10) Patent No.: US 9,694,351 B1
(45) Date of Patent: Jul. 4, 2017

(54) HIGHLY DISPERSED AND DURABLE HETEROGENEOUS CATALYSTS

(71) Applicants: Aaron Joseph Roy, Albuquerque, NM (US); Timothy L Ward, Albuquerque, NM (US); Alexey Serov, Albuquerque, NM (US); Plamen B Atanassov, Santa Fe, NM (US)

(72) Inventors: Aaron Joseph Roy, Albuquerque, NM (US); Timothy L Ward, Albuquerque, NM (US); Alexey Serov, Albuquerque, NM (US); Plamen B Atanassov, Santa Fe, NM (US)

(73) Assignee: STC.UNM, Albuquerque, NM (US)

( * ) Notice: Subject to any disclaimer, the term of this patent is extended or adjusted under 35 U.S.C. 154(b) by 0 days.

(21) Appl. No.: 14/825,534

(22) Filed: Aug. 13, 2015

Related U.S. Application Data

(63) Continuation-in-part of application No. 14/632,142, filed on Feb. 26, 2015, now Pat. No. 9,579,636.

(60) Provisional application No. 62/037,007, filed on Aug. 13, 2014, provisional application No. 62/037,007, filed on Aug. 13, 2014.

(51) Int. Cl.
| | |
|---|---|
| *B01J 27/22* | (2006.01) |
| *B01J 23/652* | (2006.01) |
| *B01J 35/02* | (2006.01) |
| *B01J 35/10* | (2006.01) |
| *B01J 35/00* | (2006.01) |

(52) U.S. Cl.
CPC ............ *B01J 27/22* (2013.01); *B01J 23/6525* (2013.01); *B01J 35/0013* (2013.01); *B01J 35/023* (2013.01); *B01J 35/1014* (2013.01)

(58) Field of Classification Search
CPC .... B01J 27/22; B01J 35/1014; B01J 35/1019; B01J 35/023; B01J 35/10; B01J 23/6525; B01J 2523/68; B01J 2523/828
USPC ................... 502/177, 313, 321, 339, 527.24
See application file for complete search history.

(56) References Cited

U.S. PATENT DOCUMENTS

| | | | | |
|---|---|---|---|---|
| 3,262,817 | A * | 7/1966 | Thompson | H01M 4/96 429/224 |
| 4,192,779 | A * | 3/1980 | Gandhi | B01D 53/9418 423/213.5 |
| 4,515,763 | A * | 5/1985 | Boudart | B01J 27/22 423/409 |
| 4,851,206 | A * | 7/1989 | Boudart | B01J 27/22 423/409 |
| 6,297,185 | B1 * | 10/2001 | Thompson | B01J 23/38 252/514 |
| 2003/0059666 | A1 * | 3/2003 | Kourtakis | H01M 4/8605 429/524 |
| 2007/0160899 | A1 * | 7/2007 | Atanassova | H01M 4/8807 429/413 |

\* cited by examiner

*Primary Examiner* — Patricia L Hailey
(74) *Attorney, Agent, or Firm* — Gonzales Patent Services; Ellen M. Gonzales

(57) ABSTRACT

Platinum or platinum group metal decorated non-oxide materials that are formed using a synthesis pathway that avoids the production of intermediate oxides. The materials are suitable for use as catalysts and may or may not be porous.

17 Claims, 27 Drawing Sheets

HIGHLY DISPERSED AND DURABLE HETEROGENEOUS CATALYSTS

CROSS-REFERENCE TO RELATED APPLICATIONS

The following application is a continuation-in-part of U.S. patent application Ser. No. 14/632,142 filed Feb. 26, 2015, which claims benefit of U.S. Provisional Application No. 61/945,045, filed Feb. 26, 2014. The following application also claims benefit of U.S. Provisional Application No. 62/037,007, filed Aug. 13, 2014. Each of these applications is hereby incorporated by reference in its entirety.

BACKGROUND

Heterogeneous catalyst phase(s) supported on porous metal-oxide, nitride, and carbide ceramics are widely used for a variety of electrochemical and heterogeneous reactions such as hydrogenation, dehydrogenation, and oxidation reactions, and ammonia synthesis. Superior heterogeneous catalysts require high dispersion of the catalytic phase to provide a high specific catalytic activity, as well as good stability of the catalytic phase, which provides good durability and lifetime for the catalyst. Traditional methods of supported heterogeneous catalyst preparation often lead to relatively poor initial dispersion of the catalyst and poor durability due to sintering or deactivation during service.

Platinum (Pt) and Pt alloys are among the most important and widely used metallic catalysts for both electrochemical applications, e.g. in PEM fuel cells, and heterogeneous catalysis. However, there are numerous other important heterogeneous catalysts based on other transition metals, their alloys, and metal/oxide composites to which this invention can be applied. In chemical and electrochemical applications of heterogeneous catalysts, it is highly desirable to have a high dispersion of the catalytic phase to provide a high specific catalytic activity, and good stability of the catalytic phase, which provides good durability and lifetime for the catalyst. The catalyst dispersion is a function of the preparation method and precursor, as well as the type and structure of the support material. Durability of the catalyst can be influenced by the initial dispersion, support interaction, subsequent sintering processes, chemical poisoning or dissolution, or instability of the support, among other things.

The most commonly used traditional methods of metal catalyst preparation, which include precipitation, impregnation methods and vapor phase deposition, often lead to relatively poor initial dispersion of the catalyst. This is often due to substantial phase segregation of the catalyst elements precursor during the catalyst preparation process.

SUMMARY

Platinum or platinum group metal decorated non-oxide materials that are formed using a synthesis pathway that avoids the production of intermediate oxides. The materials may or may not be porous. According to various embodiments the materials may be used as catalysts for a variety of applications.

BRIEF DESCRIPTION OF THE DRAWINGS

FIG. 17A is 8 wt % Pt/α-MoC$_{(1-x)}$ CO treated at 650° C.
FIG. 17B is Pt$_2$Mo,
FIG. 17C is 8 wt % Pt/α-MoC$_{(1-x)}$ CO treated at 450° C.
FIG. 17D is 8 wt % Pt/α-MoC$_{(1-x)}$ CO treated at 650° C.

FIG. 19A is a TEM image of 8 wt % Pt/α-MoC$_{(1-x)}$ prior to a CO surface treatment 650° C. for 2 hours.

FIG. 19B is the histogram corresponding to FIG. 17A.

FIG. 19C is a TEM image of 8 wt % Pt/α-MoC$_{(1-x)}$ after a CO surface treatment at 650° C. for 2 hours.

FIG. 19D is the histogram corresponding to FIG. 17C.

DETAILED DESCRIPTION

Figure 1:
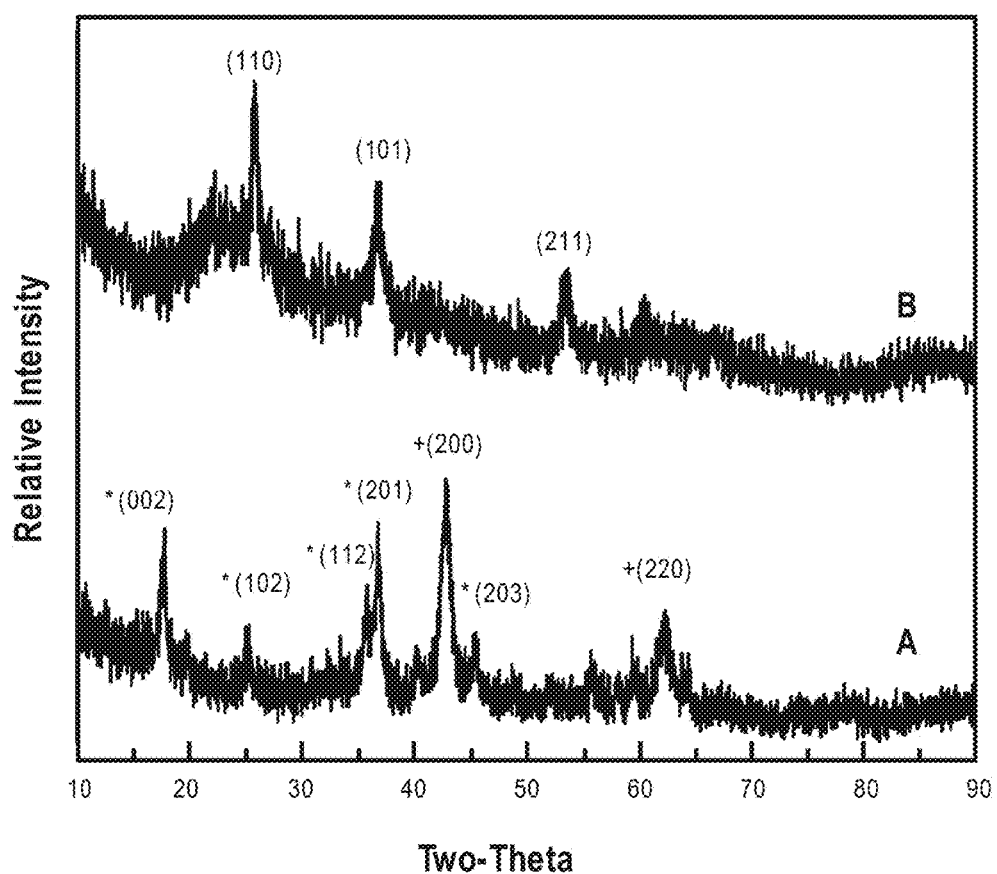
FIG. 1 is XRD patterns of intermediate species from the decomposition of (A) $Mg(MoO_4)$ to MgO (+) and $Mg_2(Mo_3O_8)$ (*), and (B) AHM to $MoO_2$ in a 5 mol % flow of $NH_3$ at 500° C. for ~30 min. All peak intensities are normalized to the (200) reflection of MgO in (A).

According to various embodiments, the present disclosure provides a novel method for producing highly dispersed and durable heterogeneous catalysts. In general, the disclosed methods and materials exploit atomic-scale initial dispersion of the primary catalytic element(s) by incorporation into one or more multicomponent phases involving the support material. This prevents, for example, the phase segregation that accompanies drying or precipitation in common typical preparation protocols. Subsequent chemical or electrochemical activation promotes development of the catalytic phase at the surface in a controlled way that provides superior dispersion, as well as strong interaction with the support material that promotes stability and durability of the catalytic phase. As a general overview, the presently described method comprises the formation of a high-surface area refractory metal-based platinum-decorated active support using a novel synthesis pathway that avoids the production of intermediate oxide. In some embodiments, the method includes the in situ formation of a sacrificial support that can be removed using non-aggressive means, such as, for example, chemical etching with a mild acid or by altering reaction conditions.

For the purposes of the present disclosure, the term "active support" means a material that actively and specifically interacts with the dispersed phase on it. Interaction is either based on a lattice match between the particle and the support or with a molecular (atomic) interaction.

The presently described method is faster than previously described methods, can easily be scaled up to produce large amounts of material, and results in a high-surface area material. For the purposes of the present disclosure, the term "high surface area" means having a surface area greater than 30 m$^2$/g, as measured by BET. For the purposes of the present disclosure, the dispersed phase is considered to be "highly dispersed" if the dispersed material has a surface area higher than 60 m$^2$/g and a particle size smaller than 50 nm. Furthermore, according to some embodiments, the presently described method is more environmentally friendly than previously described methods, as the method can be performed in a non-aggressive nitrogen-only atmosphere and can utilize chemical etching agents that are milder than HF.

According to a general embodiment, a platinum precursor is added to a ceramic material precursor that decomposes in reductive atmospheres to produce nanocrystalline products without the formation of an intermediate oxide. The mixture is then optionally co-precipitated and then decomposed to form a ceramic support decorated with the platinum material. Interestingly, as demonstrated in the Experimental section below, the resulting material is not active for electrochemical oxygen reduction until activated either by treatment in pure CO at elevated temperature, or by electrochemical cycling in the presence of CO. Moreover, while activation leads to a catalyst that has electrochemical performance similar to metallic Pt, metallic Pt is not evident by XRD. (See Experimental section below.)

For the purposes of the present disclosure, the term "precursor" is used to refer to a compound that participates in a chemical reaction by contributing one or more atoms to a compound that is formed as the product of the chemical reaction or otherwise contributes to the formation of the product. Examples of suitable platinum percursors include, but are not limited to $H_2PtCl_6 \cdot x\ H_2O$, platinum nitrate, platinum chloride, platinum acetylacetonate, etc., other suitable precursors include amino complexes including, but not limited to, ammonium tetrachloroplatinate and tetramineplatinum nitrate/chloride. While most of the examples herein are directed towards platinum-containing catalysts, it should be understood that similar catalysts can be formed from the various platinum group metals, silver, gold, or alloys thereof. The presently described method, which enables the heterogenous ccatalysts to be produced in situ, eliminates the inherent logistical difficulties in post processing freshly prepared $Mo_2C$ in oxygen-purged systems. In general, the Molybdenum precursors described herein are mixed with suitable platinum precursors, optionally co-precipitated, and then decomposed as described above. As with the methods described above, the procedure may include the in situ production of a sacrificial material, which can be removed as described above in order to produce a high surface area catalytic material.

According to some specific embodiments, the ceramic materials of the present disclosure are molybdenum-based. However, it will be understood that any refractory metal including, but not limited to niobium, tantalum, tungsten, and rhenium could be substituted in place for molybdenum.

Rapid conversion of the Mo precursor is achieved by arresting certain tetravalent molybdate intermediates using high temperature along with rapid ramp rates to maximize rates of formation of desired phases while minimizing sintering processes. According to various embodiments, suitable molybdenum precursors include various sheelite salts with the general formula $M(MoO_4)$, where M may be any divalent metal cation (Be, Mg, Ca, Sr, Ba, Mn, Zn). According to some embodiments, the salts may be selected on the basis of two criteria: first, the metal, M, must form a stable oxide; and second, the $M(MoO_4)$ salts must decompose reductively to form a tetravalent molybdate.

The first criterion ensures that an oxide product is available to provide resistance to solid-state mass transfer, effectively preventing the coarsening of grain boundaries, the result of which is likely to produce smaller grain sizes, smaller primary particle sizes, and a greater specific surface area of the molybdenum carbide/nitride.

The second criterion ensures that the M(MoO4) salts decompose reductively to form a tetravalent molybdate. This criteria acknowledges the fact that Mo(IV) is the common valency between oxide, carbide, and nitride. Therefore, a tetravalent molybdate is required for the proposed reaction pathway to carbide or nitride that is not to proceed through MoO2.

Specific examples of suitable molybdenum precursors include $Mg(MoO_4)$, $Zn(MoO4)$ $(NH_4)_6Mo_7O_{24} \cdot 4H_2O$ (AHM), and $(NH_4)_2Mg(MoO_4)_2$ (AMM), each of which is described in greater detail below in the Experimental section below and can be used to produce $Mo_2C$ and $Mo_2N$ products. Other suitable molybdenum precursors include $MoO_3$, Mo etc.

As stated above, the specific reactants and reaction conditions are selected so as to produce specific non-oxide molybdate intermediates. For example, in previously described synthesis schemes, the reaction pathway to molybdenum carbide and nitride commonly proceeds through a tetravalent molybdenum oxide intermediate, $MoO_2$ [6,16,18]. However, for the purposes of the presently described method, $MoO_2$ is an undesired intermediate phase in the production of high surface area molybdenum carbide and nitride. Accordingly, the presently described methods provide reactants and reaction conditions that utilize a tetravalent molybdate as an intermediate product. Accordingly, some specific embodiments of the presently described methods utilize reaction pathways wherein dimagnesium-trimolybdate ($Mg_2(Mo_3O_8)$) and dizinc-trimolybdate ($Zn_2(Mo_3O_8)$) are the respective intermediate phases for the use of $Mg(MoO_4)$ and $Zn(MoO_4)$ as precursors to $\alpha\text{-MoC}_{(1-x)}$ and $\beta\text{-MoN}_{(1-x)}$. Accordingly, for the case of $Mg(MoO_4)$ reacting to $\alpha\text{-MoC}_{(1-x)}$ using CO as a carbon source, the following equations apply:

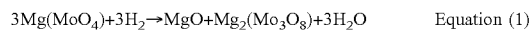

$3Mg(MoO_4)+3H_2 \rightarrow MgO+Mg_2(Mo_3O_8)+3H_2O$      Equation (1)

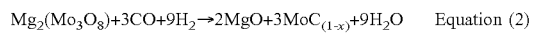

$Mg_2(Mo_3O_8)+3CO+9H_2 \rightarrow 2MgO+3MoC_{(1-x)}+9H_2O$      Equation (2)

Similarly, for the case of $Mg(MoO_4)$ reacting to produce $\beta\text{-MoN}_{(1-x)}$ using forming gas as reductant/nitrogen source, the following equations apply:

$3Mg(MoO_4)+3H_2 \rightarrow MgO+Mg_2(Mo_3O_8)+3H_2O$      Equation (3)

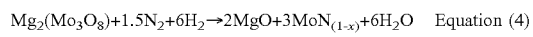

$Mg_2(Mo_3O_8)+1.5N_2+6H_2 \rightarrow 2MgO+3MoN_{(1-x)}+6H_2O$      Equation (4)

According to various embodiments, the reactants and reaction conditions can be selected so as to achieve in situ formation of a sacrificial material during the decomposition step in order to minimize contact between grain boundaries, thus preventing sintering and agglomeration of both molybdate intermediates as well as the carbide/nitride reaction products. As described in greater detail below, this sacrificial material is then removed using non-aggressive means. For the purposes of the present disclosure, the term "sacrificial support" is intended to refer to a material that is included or formed during the synthesis process in order to provide temporary structure but which is mostly or entirely removed during or after the synthesis process in order to obtain the final product.

In general, the platinum and Mo precursors are decomposed at a high temperature in a reductive atmosphere. It will be understood that the specific atmospheric components and conditions including temperature, decomposition time, volumetric flow rate, and ramp rate can affect the synthesis procedure and thus each of these should be selected based on the specific precursors being used, the intermediate product(s) to be produced, and the final materials intended to be produced. Additional specific details regarding suitable conditions for specific protocols can be found in the Experimental section below. However, suitable high temperatures for the production of the materials described herein are typically between 450° C. and 1000° C. According to certain specific examples, a temperature of between 600° C. and 800° C., and specifically a temperature of 700° C. has been found to be highly suitable with time periods depending on the specific reactants and desired final product. Examples of suitable reductive atmospheres for the synthesis of $MoC_{(1-x)}$ include $CO-H_2$ with molar mixtures of between 0.1 and 99.9. Other suitable reductive atmospheres include $CH_4$. According to certain specific examples, a molar mixture of $Co-H_2$ at 1:4 was found to be particularly suitable for certain methods of producing $\alpha\text{-MoC}_{(1-x)}$. Under some conditions, a high temperature $H_2$ treatment may be performed after the decomposition step in order to further reduce the surface of material. After heat treatment the samples may be cooled, for example, to a temperature of 400° C. under syngas or another suitable non-oxygen-containing gas and the carrier switched to an inert gas such as industrial grade argon in order to passivate the surface. The samples may then be allowed to cool to ambient temperature under argon flow. Once cooled to ambient temperatures, the flow may be switched to air or oxygen in a concentration not higher than 3 mol %. in order to passivate the formed material's surface with oxide in order to inhibit bulk oxidation of the material upon exposure to atmospheric partial pressures of $O_2$. According to one specific example, 2 mol % $O_2$ with a He balance was found to be suitable.

The decomposition products, which in some embodiments include sacrificial material, can then be removed, for example, via chemical etching with HCl or another suitable acid such as H2SO4, HF. According to some embodiments, the sacrificial material is or includes material that is highly volatile to certain conditions that could easily be achieved during synthesis or as part of a post-processing step. In this case, the sacrificial material may be wholly or partially removed by altering the synthesis conditions, which may or may not eliminate the need for the chemical etching step. For example, ZnO is highly volatile to H2 atmosphere at temperatures near 650° C. Accordingly, precursors including Zn may be used in the presently described methods, as described in greater detail in the Experimental section below and removed simply by altering the environmental conditions in which the ZnO is present. Regardless of the material used to form the sacrificial material, it will be understood that removal of the sacrificial material will leave irregularly sized voids in the final material that are shaped and positioned according to the shape and position of the sacrificial material prior to removal. Accordingly it will further be understood that the size and amount of voids in the final product can be altered by varying the ratios of the initial starting materials.

The presently described method is capable of producing particles in the 2-1000 nm size range and having a surface area of between 10 and 250 $m^2/g$. According to some specific embodiments, the method has been used to produce a primary particle size of approximately 15-30 nm with a surface area of between ~35 $m^2/g$-~45 $m^2/g$.

Alternatively, or additionally, a pre-formed sacrificial support may be included in addition to or in lieu of the in situ formed sacrificial support. In this case, the pre-formed sacrificial support may be mixed with the precursor described above under suitable conditions to allow the ceramic material to form around the sacrificial material. The ceramic material can then be removed, for example by chemical etching or other means to produce a ceramic material containing voids where the sacrificial material has previously been present. Examples of suitable sacrificial supports include particulate matter such as beads or other regular or irregular particles. According to some embodiments, the sacrificial particulate material may be formed from beads formed from a material that is non-reactive to the various conditions and materials described herein.

If needed, the material may undergo a surface treatment, such as the CO surface treatment described below in the Experimental section, in order to tune the surface properties/composition of the material transforming it from an inert to an active catalyst. As demonstrated in the Experimental section below, this method has, with platinum loadings as low as 7.5 wt %, resulted in catalysts with an electrochemical surface area of ~36 $m^2/g$ and a platinum mass activity of 137 $A/g_{pt}$, comparable to that of commercially available platinum supported on carbon black [39, 40].

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in differing orders of steps, and that they are not necessarily restricted to the orders of steps indicated herein or in the claims. As used herein and in the appended claims, the singular forms "a," "an," and "the" include plural reference unless the context clearly dictates otherwise.

Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All patents and publications referenced below and/or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications.

REFERENCES

1. Oh, H. S.; Lee, J. H.; Kim, H., Electrochemical carbon corrosion in high temperature proton exchange membrane fuel cells. Int. J. Hydrog. Energy 2012, 37 (14), 10844-10849.
2. Shao, Y. Y.; Yin, G. P.; Gao, Y. Z., Understanding and approaches for the durability issues of Pt-based catalysts for PEM fuel cell. J. Power Sources 2007, 171 (2), 558-566.
3. Blackmore, K. J.; Elbaz, L.; Bauer, E.; Brosha, E. L.; More, K.; McCleskey, T. M.; Burrell, A. K., High Surface Area Molybdenum Nitride Support for Fuel Cell Electrodes. J. Electrochem. Soc. 2011, 158 (10), B1255-B1259.

4. Hugosson, H. W.; Jansson, U.; Johansson, B.; Eriksson, O., Phase stability diagrams of transition metal carbides, a theoretical study. Chem. Phys. Lett. 2001, 333 (6), 444-450.
5. Oshikawa, K.; Nagai, M.; Omi, S., Characterization of molybdenum carbides for methane reforming by TPR, XRD, and XPS. J. Phys. Chem. B 2001, 105 (38), 9124-9131.
6. Kojima, R.; Aika, K., Molybdenum nitride and carbide catalysts for ammonia synthesis. Appl. Catal. A-Gen. 2001, 219 (1-2), 141-147.
7. Wu, Q. X.; Christensen, J. M.; Chiarello, G. L.; Duchstein, L. D. L.; Wagner, J. B.; Temel, B.; Grunwaldt, J. D.; Jensen, A. D., Supported molybdenum carbide for higher alcohol synthesis from syngas. Catal. Today 2013, 215, 162-168.
8. Hynaux, A.; Sayag, C.; Suppan, S.; Trawczynski, J.; Lewandowski, M.; Szymanska-Kolasa, A.; Djega-Mariadassou, G., Kinetic study of the hydrodesulfurization of dibenzothiophene over molybdenum carbides supported on functionalized carbon black composite—Influence of indole. Appl. Catal. B-Environ. 2007, 72 (1-2), 62-70.
9. Ramanathan, S.; Yu, C. C.; Oyama, S. T., New catalysts for hydroprocessing: Bimetallic oxynitrides II. Reactivity studies. J. Catal. 1998, 173 (1), 10-16.
10. Vrubel, H.; Hu, X. L., Molybdenum Boride and Carbide Catalyze Hydrogen Evolution in both Acidic and Basic Solutions. Angew. Chem.-Int. Edit. 2012, 51 (51), 12703-12706.
11. Volpe, L.; Boudart, M., Compounds of Molybdenum and Tungsten with High Specific Surface-Area-.2. Nitrides. J. Solid State Chem. 1985, 59 (3), 332-347.
12. Volpe, L.; Boudart, M., Compounds of Molybdenum and Tungsten with High Specific Surface-Area-.2. Carbides. J. Solid State Chem. 1985, 59 (3), 348-356.
44
13. Bouchy, C.; Hamid, S.; Derouane, E. G., A new route to the metastable FCC molybdenum carbide alpha-MoC1-x. Chem. Commun. 2000, (2), 125-126.
14. Zhu, Q. L.; Chen, Q. G.; Yang, X. B.; Ke, D. X., A new method for the synthesis of molybdenum carbide. Mater. Lett. 2007, 61 (29), 5173-5174.
15. Patel, M.; Subrahmanyam, J., Synthesis of nanocrystalline molybdenum carbide (Mo2C) by solution route. Mater. Res. Bull. 2008, 43 (8-9), 2036-2041.
16. Hanif, A.; Xiao, T. C.; York, A. P. E.; Sloan, J.; Green, M. L. H., Study on the structure and formation mechanism of molybdenum carbides. Chem. Mat. 2002, 14 (3), 1009-1015.
17. Weimer, A. W., Carbide, Nitride, and Boride Materials Synthesis and Processing. Chapman & Hall: London, 1997; p 79-80.
18. Wise, R. S.; Markel, E. J., Synthesis of high-SurfaceArea Molybdenum Nitride in Mixtures of Nitrogen and Hydrogen. J. Catal. 1994, 145 (2), 344-355.
19. Robson, M. H.; Serov, A.; Artyushkova, K.; Atanassov, P., A mechanistic study of 4-aminoantipyrine and iron derived non-platinum group metal catalyst on the oxygen reduction reaction. Electrochim. Acta 2013, 90, 656-665.
20. Brocato, S.; Serov, A.; Atanassov, P., pH dependence of catalytic activity for ORR of the non-PGM catalyst derived from heat-treated Fe-phenanthroline. Electrochim. Acta 2013, 87, 361-365.
21. Serov, A.; Robson, M. H.; Artyushkova, K.; Atanassov, P., Templated non-PGM cathode catalysts derived from iron and poly(ethyleneimine) precursors. Appl. Catal. B-Environ. 2012, 127, 300-306.
22. Serov, A.; Robson, M. H.; Smolnik, M.; Atanassov, P., Templated bi-metallic non-PGM catalysts for oxygen reduction. Electrochim. Acta 2012, 80, 213-218.
23. Serov, A.; Martinez, U.; Falase, A.; Atanassov, P., Highly active Pd—Cu catalysts for electrooxidation of 2-propanol. Electrochem. Commun. 2012, 22, 193-196.
24. Falase, A.; Main, M.; Garcia, K.; Serov, A.; Lau, C.; Atanassov, P., Electrooxidation of ethylene glycol and glycerol by platinum-based binary and ternary nanostructured catalysts. Electrochim. Acta 2012, 66, 295-301.
25. Weirich, F. A. A Study of the Reduction of Zinc Oxide by Hydrogen and Methane School of Mines and Metallurgy of the University of Missouri, Rolla, Mo., 1926.
26. Belgued, M.; Pareja, P.; Amariglio, A.; Amariglio, H., Conversion of Methane Into Higher Hydrocarbons on Platinum. Nature 1991, 352 (6338), 789-790.
27. Davis, R. J.; Derouane, E. G., A Nonporous SupportedPlatinum Catalyst For Aromization Of N-Hexane. Nature 1991, 349 (6307), 313-315.
28. Liang, C. C.; Juliard, A. L., Reduction of Oxygen at Platinum Electrode. Nature 1965, 207 (4997), 629-&.
29. Tian, N.; Zhou, Z. Y.; Sun, S. G.; Ding, Y.; Wang, Z. L., Synthesis of tetrahexahedral platinum nanocrystals with high-index facets and high electro-oxidation activity. Science 2007, 316 (5825), 732-735.
30. Tupy, S. A.; Chen, J. G. G.; Vlachos, D. G., Comparison of Ethylene Glycol Steam Reforming Over Pt and NiPt Catalysts on Various Supports. Top. Catal. 2013, 56 (18-20), 1644-1650.
31. Obradovic, A.; Likozar, B.; Levec, J., Catalytic surface development of novel nickel plate catalyst with combined thermally annealed platinum and alumina coatings for steam methane reforming. Int. J. Hydrog. Energy 2013, 38 (3), 1419-1429.
32. Serov, A.; Martinez, U.; Atanassov, P., Novel Pd—In catalysts for alcohols electrooxidation in alkaline media. Electrochem. Commun. 2013, 34, 185-188.
33. Serov, A.; Robson, M. H.; Smolnik, M.; Atanassov, P., Tri-metallic transition metal-nitrogen-carbon catalysts derived by sacrificial support method synthesis. Electrochim. Acta 2013, 109 (0), 433-439.
34. Robson, M. H.; Serov, A.; Artyushkova, K.; Atanassov, P., A mechanistic study of 4-aminoantipyrine and iron derived non-platinum group metal catalyst on the oxygen reduction reaction. Electrochim. Acta 2013, 90, 656-665.
35. Bashyam, R.; Zelenay, P., A class of non-precious metal composite catalysts for fuel cells. Nature 2006, 443 (7107), 63-66.
36. Wu, G.; More, K. L.; Johnston, C. M.; Zelenay, P., High-Performance Electrocatalysts for Oxygen Reduction Derived from Polyaniline, Iron, and Cobalt. Science 2011, 332 (6028), 443-447.
37. Lefevre, M.; Proietti, E.; Jaouen, F.; Dodelet, J. P., Iron-Based Catalysts with Improved Oxygen Reduction Activity in Polymer Electrolyte Fuel Cells. Science 2009, 324 (5923), 71-74.
38. Weidman, M. C.; Esposito, D. V.; Hsu, Y. C.; Chen, J. G., Comparison of electrochemical stability of transition metal carbides (WC, W2C, MO2C) over a wide pH range. J. Power Sources 2012, 202, 11-17.
39. Kriston, A.; Xie, T. Y.; Gamliel, D.; Ganesan, P.; Popov, B. N., Effect of ultra-low Pt loading on mass activity of polymer electrolyte membrane fuel cells. J. Power Sources 2013, 243, 958-963.

40. Patel, S.; Jiang, J. C.; Liu, F. Q., Facile synthesis and characterization of highly dispersed platinum nanoparticles for fuel cells. Int. J. Hydrog. Energy 2011, 36 (17), 11108-11115.
41. Andersson, K. J.; Calle-Vallejo, F.; Rossmeisl, J.; Chorkendorff, L., Adsorption-Driven Surface Segregation of the Less Reactive Alloy Component. J. Am. Chem. Soc. 2009, 131 (6), 2404-2407.
42. Wu, J. B.; Yang, H., Platinum-Based Oxygen Reduction Electrocatalysts. Accounts Chem. Res. 2013, 46 (8), 1848-1857.
43. Job, N.; Chatenet, M.; Berthon-Fabry, S.; Hermans, S.; Maillard, F., Efficient Pt/carbon electrocatalysts for proton exchange membrane fuel cells: Avoid chloride-based Pt salts! J. Power Sources 2013, 240 (0), 294-305.
44. Santos, L. G. R. A.; Freitas, K. S.; Ticianelli, E. A., Heat treatment effect of Pt—V/C and Pt/C on the kinetics of the oxygen reduction reaction in acid media. Electrochim. Acta 2009, 54 (22), 5246-5251.
45. Hayden, B. E.; Pletcher, D.; Suchsland, J. P.; Williams, L. J., The influence of support and particle size on the platinum catalysed oxygen reduction reaction. Phys. Chem. Chem. Phys. 2009, 11 (40), 9141-9148.
46. Porsgaard, S.; Merte, L. R.; Ono, L. K.; Behafarid, F.; Matos, J.; Helveg, S.; Salmeron, M.; Cuenya, B. R.; Besenbacher, F., Stability of Platinum Nanoparticles Supported on $SiO_2/Si(111)$: A High-Pressure X-ray Photoelectron Spectroscopy Study. ACS Nano 2012, 6 (12), 10743-10749.
47. Lawson, A. C., Superconductivity of the f.c.c. transition metals, and of their alloys and f.c.c. carbides. Journal of the Less Common Metals 1971, 23 (1), 103-106.
48. R. Ferro, M., R., The Mo—N(Molybdenum-Nitrogen) System. Bulletin of Allow Phase Diagrams 1980, 1 (2), 82-85.
49. FactSage STGE Solution Databse List of Systems and Phases. http://www.factsage.cn/fact/documentation/SGTE/SGTE_list.htm (accessed Nov. 11, 2013).
50. Liu, Y.; Kelly, T. G.; Chen, J. G. G.; Mustain, W. E., Metal Carbides as Alternative Electrocatalyst Supports. ACS Catal. 2013, 3 (6), 1184-1194.
51. Demczyk, B. G.; Choi, J. G.; Thompson, L. T., SURFACE-STRUCTURE AND COMPOSITION OF HIGH-SURFACE-AREA MOLYBDENUM NITRIDES. Appl. Surf. Sci. 1994, 78 (1), 63-69.
52. Gardo, M. N. Determination of the Tribological Fundamentals of Solid Lubricatiod Ceramics Hughes Aircraft Company: 1991; p P27.

Experimental

Synthesis of Molybdic Acid, $H_2(MoO_4)$—Method 1

Molybdic acid, $H_2(MoO_4)$, was prepared by adding $MoO_3$ powder (Sigma-Aldrich) to an excess amount of 30 wt % $H_2O_2$ (Sigma-Aldrich). The mixture was heated on a hot plate until the $MoO_3$ was fully dissolved and the solution, yellow in color, became transparent. The solution of $H2(MoO_4)$ and excess $H_2O_2$ was brought to a boil to decompose excess peroxide. Next, the $H2(MoO_4)$ was removed from the hot plate and an excess amount of MgO powder (UBE Material Industries, Ltd.) was added directly to $H^2(MoO^4)$. The resulting acid/base reaction produces magnesium molybdate, $Mg(MoO_4)$. Water soluble $Mg(MoO_4)$ was then isolated by the filtration of insoluble MgO, which was added in excess to insure complete conversion of $H2(MoO_4)$. The solution of $Mg(MoO_4)$ was then brought to a boil on a hot plate until dried and the crystallized $Mg(MoO_4)$ was collected.

Synthesis of Molybdic Acid, $H_2MoO_4$—Method 2

Molybdic acid, $H_2MoO_4$, was prepared by adding $MoO_3$ powder (Sigma-Aldrich) to an excess amount of 30 wt. % $H_2O_2$ (Sigma-Aldrich). The mixture was heated on a hot plate until the $MoO_3$ was fully dissolved and the solution, yellow in color, became transparent. Next, the $H_2MoO_4$ was removed from the hot plate and an excess amount of MgO powder (UBE Material Industries, Ltd.) was added directly to $H_2MoO_4$. The resulting acid-base reaction produces magnesium molybdate, $MgMoO_4$. Water soluble $MgMoO_4$ was then isolated by the filtration of insoluble MgO, which was added in excess to insure complete conversion of $H_2MoO_4$. The solution of $MgMoO_4$ was then dried at ~150° C. in air and the crystalline $MgMoO_4$ was collected.

Synthesis of $Zn(MoO4)$

For the preparation of $Zn(MoO_4)$, the procedure for $Mg(MoO4)$ synthesis (method 1, above) was modified slightly. As $Zn(MoO_4)$ is insoluble in water, high purity ZnO (Sigma-Aldrich) was added to an excess amount of $H_2(MoO_4)$. The precipitate, $Zn(MoO_4)$, was then isolated by centrifuging the reaction mixture, decanting the excess $H_2(MoO_4)$, and then adding deionized water. This step was repeated until all excess $H_2(MoO_4)$ was removed. The $Zn(MoO_4)$ precipitate was then placed in an oven and dried in air at ~100° C. for several hours. It is important to note that this procedure yields a monoclinic phase of $Zn(MoO_4)$, where a triclinic phase can be prepared by slight modification of this procedure. In the case of $Zn(MoO_4)$ and $Mg(MoO_4)$ the monoclinic structures were used explicitly in this study.

Synthesis of $(NH_4)_2Mg(MoO_4)_2$ AMM

For the preparation of $(NH_4)_2Mg(MoO_4)_2$ (AMM), the procedure for $MgMoO_4$ synthesis (method 2 above) was modified slightly. A stoichiometric amount of MgO was added to $H_2MoO_4$ followed by the addition of excess 30 wt. % $(NH_4)OH$ solution. The resulting product was dried in air at ~150° C. and the crystalline product was collected. In an alternative method, the excess saturated $NH_4(OH)$ solution was added during continuous heating on a hot plate and once the reaction appeared to reach completion, the product was dried in air at 85° C.

Synthesis of $\alpha$-$MoC_{(1-x)}$ in Syngas

For the preparation of $\alpha$-$MoC_{(1-x)}$, 0.4 g of $Mg(MoO_4)$ or $Zn(MoO_4)$ was placed in a 7 mL porcelain combustion boats inside of a 1 inch diameter quartz tube. The quartz tube was then heated using a 14 inch single zone tube furnace in a 1:4 molar mixture of CO—$H_2$ at a total volumetric flow rate of 200 mL/min. The reactor temperature was ramped from ambient temperature to 700° C. at a rate of ~40° C./min.

In the case of $Mg(MoO_4)$, the synthesis temperature of 700° C. was held for 2.0 hours under continuous flow of a 1:4 molar mixture of CO—$H_2$ at a rate of 200 mL/min, followed by a treatment in pure $H_2$ at a flow rate of 120 mL/min at 700° C. for 20 minutes. For the synthesis of $\alpha$-$MoC_{(1-x)}$ using $Zn(MoO_4)$, the synthesis temperature of 700° C. in a 1:4 molar mixture of CO—$H_2$ was maintained for only 30 minutes, there was no addition $H_2$ treatment. After the heat treatment, all samples were cooled to ~400° C. under syngas where the carrier was then switched to a flow of industrial grade argon. The quartz reactor tubes were then removed from the furnace and allowed to cool to ambient temperature under argon flow. Once at ambient temperature, the flow was switched to 2 mol % $O_2$ with a He balance for ~1 hour. This step is intended to passivate the α-MoC$_{(1-x)}$ surface with oxide to inhibit bulk oxidation of the material upon exposure to atmospheric partial pressures of O$_2$.

In both cases, the decomposition products, MgO and ZnO respectively, were removed by etching in 7M HCl. The products were then washed in deionized water by centrifuging followed by decanting of soluble phases. This process was repeated until a neutral pH was achieved, approximately 6 wash cycles, and the samples were then dried at ~85° C. in air for 12-18 hrs.

Identification of Intermediate Species

To identify possible intermediate species, Mg(MoO$_4$) was partially decomposed at 500° C. in a 5 mol % flow of NH$_3$, N$_2$ balance, for ~30 minutes. The decomposition products of Mg(MoO$_4$) were compared to that of AHM treated under identical conditions.

Powder X-ray diffraction analysis was performed using a Rigaku Smartlab with Brag-Brentano focusing and Cu K$_\alpha$ radiation (40 kV, 40 mA). The detector used was the Rigaku D/teX Ultra 250 1D silicon strip detector. Scanning Electron Microscopy was performed using a Hitachi S-5200 SEM where powder samples were disbursed onto carbon tape adhered to an aluminum sample plate. The accelerating voltage used was 2 kV. XRD patterns in FIG. 1, for both cases, show the reduction of molybdenum, initially Mo$^{(VI)}$, to a valence state of four. Surface areas were measured using N$_2$ adsorption via four point BET analysis, carried out in a Micrometrics 2360 Gemini Analyzer.

This result suggests that dimagnesium-trimolybdate, Mg$_2$(Mo$_3$O$_8$), can replace MoO$_2$ as the intermediate phase to carbide or nitride when starting from Mg(MoO$_4$). It was also verified that Zn(MoO$_4$) decomposes to an analogous Zn$_2$(Mo$_3$O$_8$) and ZnO under identical conditions. Thus, Mg(MoO$_4$) and Zn(MoO$_4$) satisfy both criteria, establishing these salts as possible precursors to α-MoC$_{(1-x)}$ and β-MoN$_{(1-x)}$.

Synthesis of α-MoC$_{(1-x)}$ from MgMoO$_4$

α-MoC(1-x) was prepared by the reaction of Mg(MoO$_4$) in mixtures of CO and H$_2$. The molar ratio of CO to H$_2$ was held constant at 1:4 and synthesis temperatures were varied from the approximated thermodynamic minimum of 469° C., where ΔrG°=0, to ~25° C. below an upper limit determined experimentally [17]. The upper limit was defined as the onset temperature when the formation of hexagonal phase molybdenum carbide, β-Mo$_2$C, was observed. The purpose for this was to selectively exclusively produce cubic α-MoC$_{(1-x)}$ at a maximum rate of reaction. The upper temperature limit was found to be ~725° C.

Figure 2:
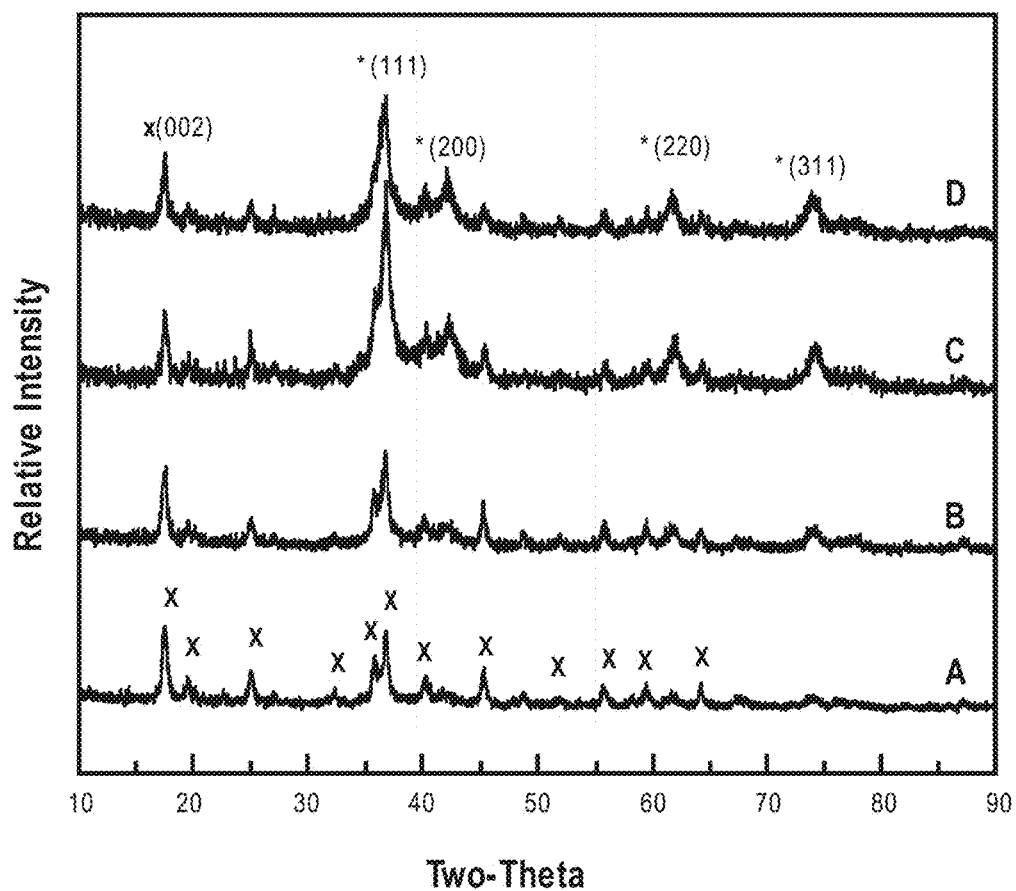
FIG. 2 is XRD patterns showing conversion of $Mg_2(Mo_3O_8)$ to $\alpha$-$MoC_{(1-x)}$ at 700° C.: (A) ~10% conversion after 1.0 hr, (B) ~35% after 1.5 hr, (C), ~60% after 2.0 hr, and (D) ~65% after 2.5 hr. In all samples MgO was etched using HCl. All peaks are normalized to the (002) reflection of $Mg_2(Mo_3O_8)$ in "A", of which reflections are denoted by "x". $\alpha$-$MoC_{(1-x)}$ reflections denoted by (*).

XRD was used to study the effect of synthesis time on conversion. Samples were heat treated at 700° C. from 1.0-2.5 hours, followed by passivation in a low concentration of 02 then post processing in HCl to etch MgO. Whole pattern fitting (WPF) using MDI JADE 2010™ analytical software was used to determine relative ratios of α-MoC$_{(1-x)}$ and Mg$_2$(Mo$_3$O$_8$). This data was then used to calculate total molar conversion. Conversion was also calculated through a material balance based on experimental and theoretical yield. Material balance calculations were in agreement with XRD WPF calculations within approximately ±5%. FIG. 2 shows XRD patterns for samples heat treated for 1.0 hr, 1.5 hr, 2.0 hr, and 2.5 hr under identical conditions. Molar conversions of Mg$_2$(Mo$_3$O$_8$) were calculated to be ~10, 35, 60, and 65% respectively. Results show the observed rate of reaction (2) slows significantly with increased conversion and that the rate limiting step is the decomposition of Mg$_2$(Mo$_3$O$_8$), not the decomposition of Mg(MoO$_4$).

An additional reaction where α-MoC$_{(1-x)}$ can be used as a carbon source was investigated. Here, the reduction of Mg$_2$(Mo$_3$O$_8$) by H$_2$ provides the necessary redox potential for the direct reaction of solid species α-MoC$_{(1-x)}$ and Mg$_2$(Mo$_3$O$_8$).

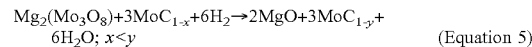

$$Mg_2(Mo_3O_8) + 3MoC_{1-x} + 6H_2 \rightarrow 2MgO + 3MoC_{1-y} + 6H_2O;\ x<y \qquad \text{(Equation 5)}$$

Reaction (5) allows for a carbon rich phase of α-MoC$_{(1-x)}$ to be converted to a molybdenum rich phase by the removal of the carbon source from the feed. An assumption was made that α-MoC$_{(1-x)}$ produced from Reaction (5) serves as the sole carbon source for reaction (6) and that x=0. These assumptions then set a minimum intermediate molar conversion, based on Reaction (5), of Mg$_2$(Mo$_3$O$_8$) at 50%, prior to the use of Reaction (6). At intermediate conversions of Reaction (5) less than 50%, Mg$_2$(Mo$_3$O$_8$) will be reduced to molybdenum as the available carbon is becomes depleted. This corresponds to x=0.5. Once this minimum conversion was reached, the CO feed was stopped and pure H$_2$ was used to carry out the additional heat treatment, again at 700° C.

Figure 3:
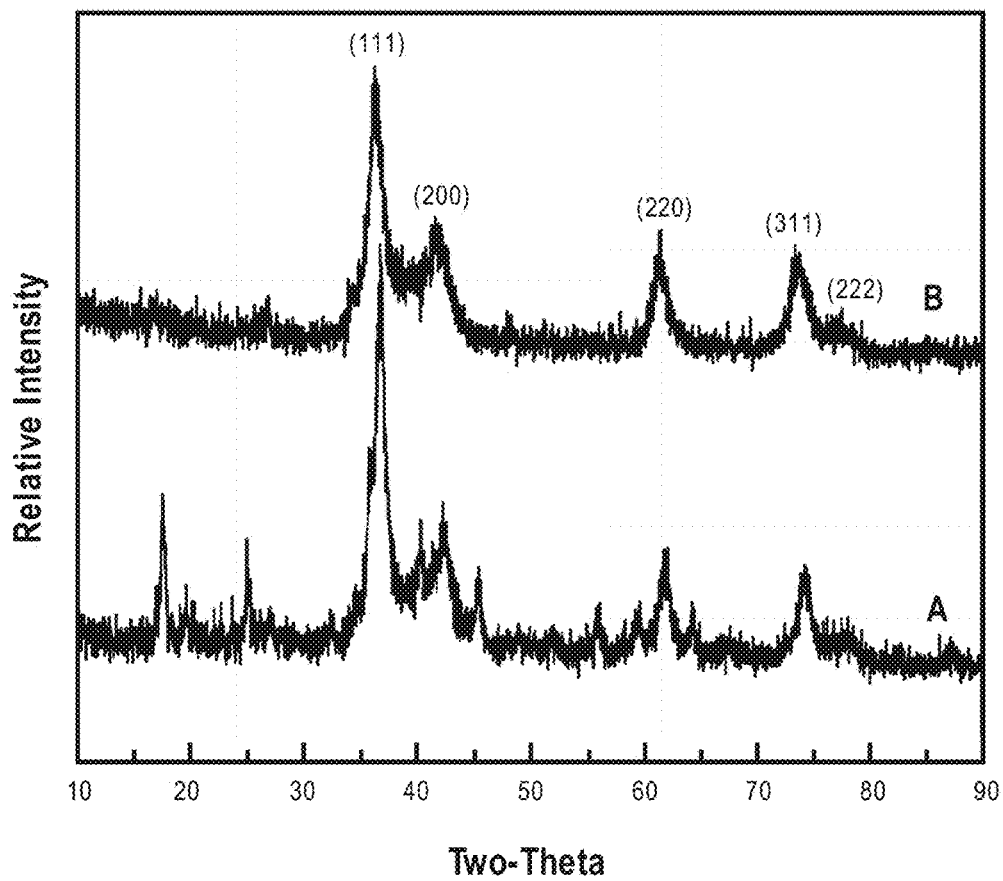
FIG. 3 is XRD patterns showing conversion of $Mg_2(Mo_3O_8)$ to (A) $\alpha$-$MoC_{(1-x)}$ at 60% conversion after 2 hr of reaction (2) at 700° C., and (B) $\alpha$-$MoC_{(1-y)}$ at 95% conversion after 2 hr of reaction (2) at 700° C. followed by 10 min of reaction (3). In both samples, MgO was etched using HCl.

FIG. 3 shows the rapid conversion reached, from an intermediate conversion 65% to 95% after only 10 minutes in pure H$_2$. Further evidence of this reaction can be seen by XRD as subtle shifts in the peak positions to slightly lower values of 2θ. This is an expected result for a shift from a carbon rich phase to a Mo rich phase of α-MoC$_{(1-y)}$, indicating a decreasing lattice parameter with decreasing carbon content.

Figure 4:
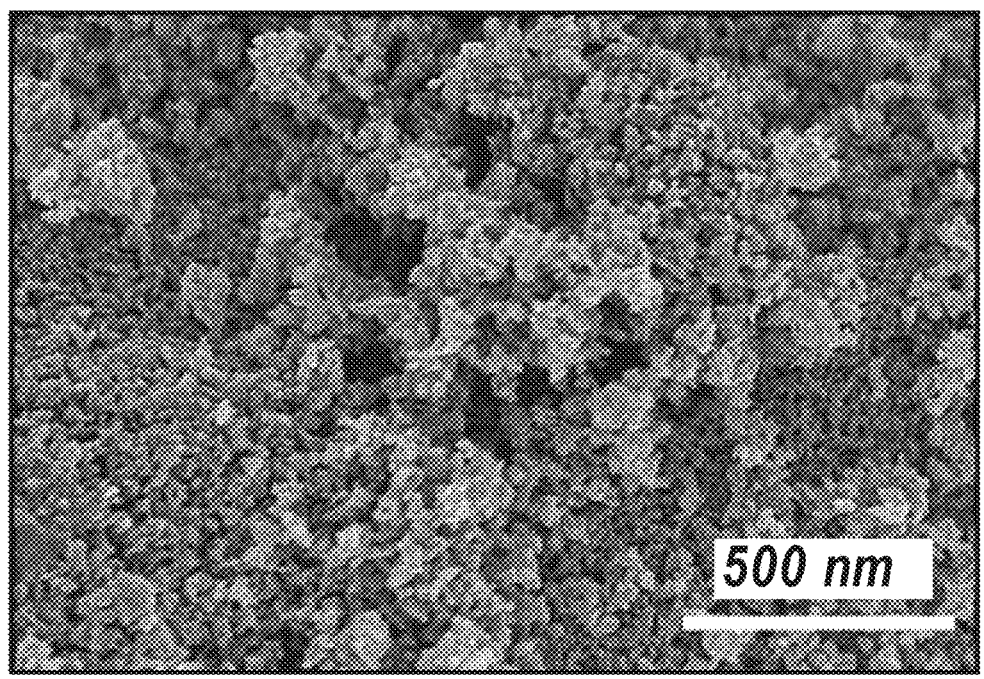
FIG. 4 is an SEM image of $\alpha$-$MoC_{(1-y)}$ prepared using $Mg(MoO_4)$ in a 1:4 molar flow of CO—$H_2$ at 700° C. for 2 hours followed by treatment in pure $H_2$ for 20 minutes. MgO was etched by HCl.

FIG. 4 is an SEM image of α-MoC$_{(1-y)}$ prepared using Mg(MoO$_4$) in a 1:4 molar flow of CO—H$_2$ at 700° C. for 2 hours followed by treatment in pure H$_2$ for 20 minutes. MgO was etched by HCl.

Synthesis of α-MoC$_{(1-x)}$ from Zn(MoO$_4$) in Syngas

Zn(MoO$_4$) was studied as an alternative precursor to Mg(MoO$_4$). Initially, Zn(MoO$_4$) was used in an attempt to eliminate post processing in HCl by making use of the volatile decomposition of ZnO, occurring in a H$_2$ atmosphere and at temperatures near 650° C. [25]. Analogous to the synthesis of α-MoC$_{(1-x)}$ using Mg(MoO$_4$), Zn(MoO$_4$) was found to decompose to an intermediate dizinc-trimolybdate phase, Zn$_2$(Mo$_3$O$_8$).

Figure 5:
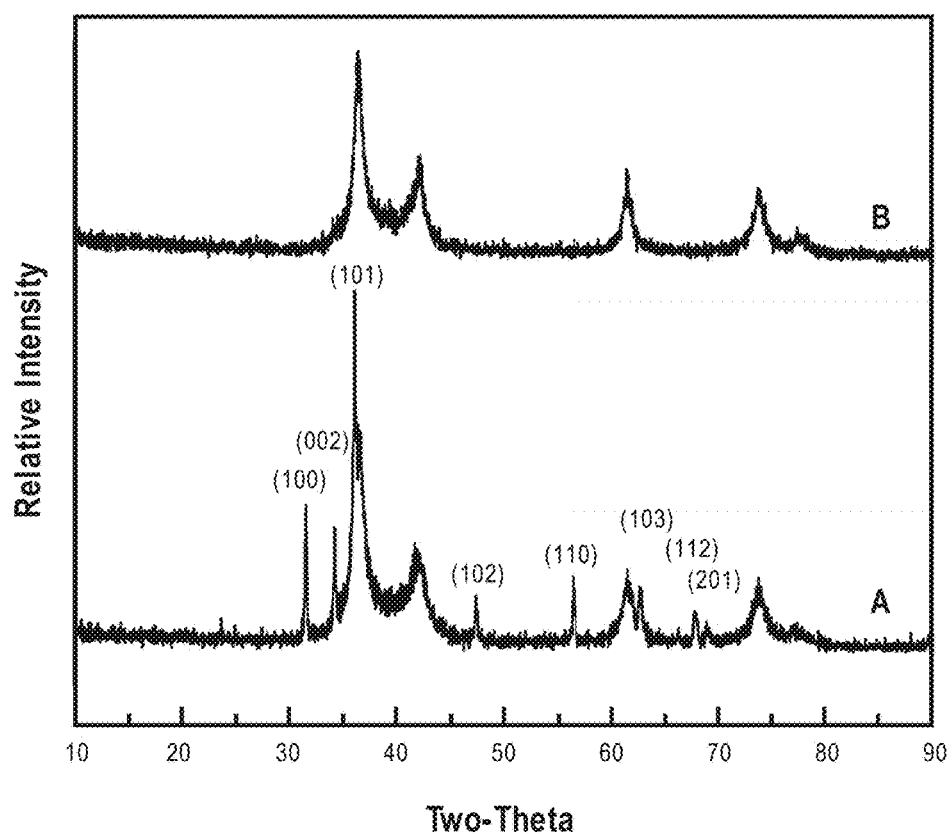
FIG. 5 is XRD patterns showing (A) conversion of $Zn_2(Mo_3O_8)$ to $\alpha$-$MoC_{(1-x)}$ and ZnO at in a 1:4 molar flow of CO—$H_2$ at 700° C. for 30 minutes, and (B) thermal removal of ZnO in a 1:4 molar flow of CO—$H_2$ at 700° C. for 5 hours. $\alpha$-$MoC_{(1-x)}$ reflections are not labeled.

This intermediate was then treated in a 1:4 molar ratio of CO to H$_2$ at 700° C. where the observed rate of reaction was found to be much greater than in the case of Mg$_2$(Mo$_3$O$_8$). Unlike Mg$_2$(Mo$_3$O$_8$), where conversion to α-MoC$_{(1-x)}$ was less than 10% after 1.0 hours, Zn$_2$(Mo$_3$O$_8$) was converted entirely to α-MoC$_{(1-x)}$ in as little as 0.5 hours. FIG. 5, band A shows the rapid conversion of Zn$_2$(Mo$_3$O$_8$) to α-MoC$_{(1-x)}$ obtained after only 30 minutes at 700° C.

ZnO was successfully removed by volatilization of Zn produced by the thermal decomposition of ZnO in H$_2$, Equation (6). This process was carried out under the synthesis conditions of a 1:4 molar ratio of CO to H$_2$ at 700° C. A total of ~5 hours were required to remove ZnO below trace amounts found by XRD, FIG. 5, band B. Attempts were made to accelerate the decomposition of ZnO in pure H$_2$ and at higher temperature; however these attempts resulted in the formation of hexagonal carbide, β-Mo$_2$C. It is unclear as to what role CO plays in the inhibition of this phase transition.

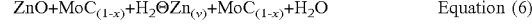

$$ZnO + MoC_{(1-x)} + H_2 \ominus Zn_{(v)} + MoC_{(1-x)} + H_2O \qquad \text{Equation (6)}$$

Figure 6:
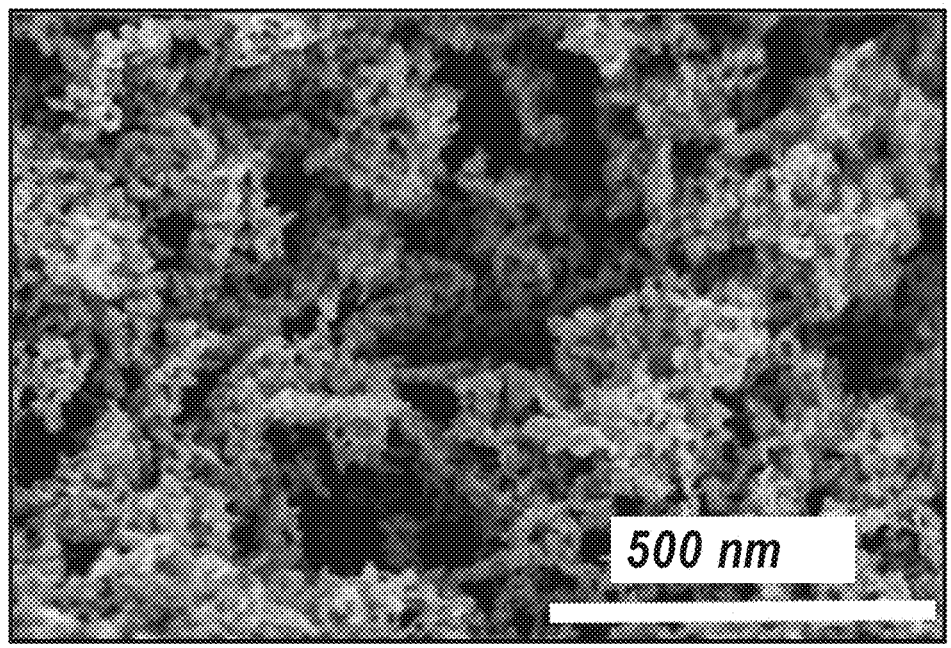
FIG. 6 is an SEM image of $\alpha$-$MoC_{(1-x)}$ prepared by the reaction $Zn(MoO_4)$ in a 1:4 molar flow of CO—$H_2$ at 700° C. for 30 minutes. ZnO was etched by HCl.

No evidence of Zn$_2$(Mo$_3$O$_8$) was found in either sample prepared with and without the thermal removal of ZnO described by Reaction (4). Although ZnO was successfully removed in situ, bulk sintering at these temperatures is a concern and HCl was favored for the etching of ZnO to yield higher surface area materials. SEM images shown in FIG. 6 reveal a more nanocrystalline morphology of α-MoC$_{(1-x)}$ than was achieved using Mg(MoO$_4$). Primary particle sizes were found to be approximately <20 nm which is consistent with the surface area measured by BET, ~45 m$^2$/g. The significant increase in surface area obtained using Zn(MoO$_4$) is directly attributed to the rapid rate of reaction, and low overall synthesis time, reducing the effects of sintering and grain coarsening.

Synthesis of PtMoz Supported on α-MoC$_{(1-x)}$

A known amount of (NH$_4$)$_2$Mg(MoO$_4$)$_2$ was dissolved in deionized water and brought to a boil. An appropriate amount of H$_2$(PtCl$_6$) was dissolved in deionized water then added to the boiling solution of (NH$_4$)$_2$Mg(MoO$_4$)$_2$; the amount of H$_2$(PtCl$_6$) added was based on a desired mass loading of Pt on α-MoC$_{(1-x)}$. An excess of saturated (NH$_4$)OH solution was then added to the boiling mixture where continuous heat was applied until a white precipitate was formed. The precipitate was allowed to dry completely in air at 85° C. Once dried the precursor was finely ground using a mortar and pestle.

Approximately 0.5 g of the ground precursor was then placed in a 7 mL porcelain combustion boat then placed inside of a 1 inch diameter quartz tube. The quartz tube was then heated using a 14 inch single zone tube furnace. A 1:4 molar mixture of CO—H2 at a total volumetric flow rate of 200 mL/min was used as the reaction atmosphere. The reactor temperature was ramped from ambient temperature to 675° C. at a rate of ~40° C./min. After 1.5 hours at 675° C., the reactor was cooled to 650° C. and the feed was switched to a pure CO atmosphere at a rate of 100 mL/min. After 2 hours, the reactor was cooled to room temperature, the feed was switched to 2% O$_2$ with a He balance, and these conditions were maintained for ~12-18 hours in order to passivate the α-MoC$_{(1-x)}$ catalyst surface. The powder was then removed from the furnace and was etched in 7 M HCl to remove MgO. The product was then washed in deionized water by identical procedures described in section 1.2.1. Samples were then washed, 2 additional cycles, in 200 proof ethanol then dried in vacuum (~30 inHg) at room temperature for ~12-18 hours.

Additional samples were prepared under the conditions described by Reaction (6) where it was found that a total of 20 minutes were required to obtain complete conversion of Mg$_2$(Mo$_3$O$_8$) to α-MoC$_{(1-y)}$. Sample purity was confirmed by XRD. SEM images in FIG. 4 show this material to possess a relatively uniform and equiaxed primary particle size between approximately 15 nm and 30 nm, with agglomerates on the order of sever microns. The specific surface area was measured, using four point BET analysis, to be 35 m$^2$/g. This result is consistent with an average particle size of 20 nm.

Electrochemical measurements of ORR performance were conducted in a three electrode cell with 0.1M HClO$_4$ as the electrolyte. A rotating disk electrode (RDE) was used as the working electrode and a real hydrogen electrode (RHE) as the reference electrode. Forming gas, consisting of 6% H$_2$, was used at the reference electrode for which a correction of +39 mV to all experimentally collected data was applied. A Pine Instrument Company rotator was used to collect ORR data at 100, 225, 400, 625, and 900 RPM at a scan rate of 5 mV/s and 100 mV/s in both 02 and N$_2$ saturated electrolyte.

TEM images were acquired using a JEOL 2010 instrument with an accelerating voltage of 200 kV. Data analysis was performed using GATAN Digital Micrograph software where TEM images were digitally converted into spot diffraction patterns using the built in script files "diffractogram3.s". These diffraction patterns were then used to measure crystallite d-spacing values by utilizing the built in script file "peak4.s".

Synthesis of β-MoN$_{(1-x)}$ from MgMoO$_4$ in Forming Gas

In order to demonstrate ammonia-free synthesis without TPR, reaction (1) was again applied using Mg(MoO$_4$), where R=N$_2$. An overall pathway to β-MoN$_{(1-x)}$ in a mixture of N$_2$—H$_2$ is described by Reactions (2) and (4), disclosed above, but repeated here for clarity.

$$3Mg(MoO_4)+3H_2 \rightarrow MgO+Mg_2(Mo_3O_8)+3H_2O \quad \text{Equation (2)}$$

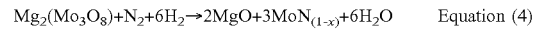
$$Mg_2(Mo_3O_8)+N_2+6H_2 \rightarrow 2MgO+3MoN_{(1-x)}+6H_2O \quad \text{Equation (4)}$$

Figure 7:
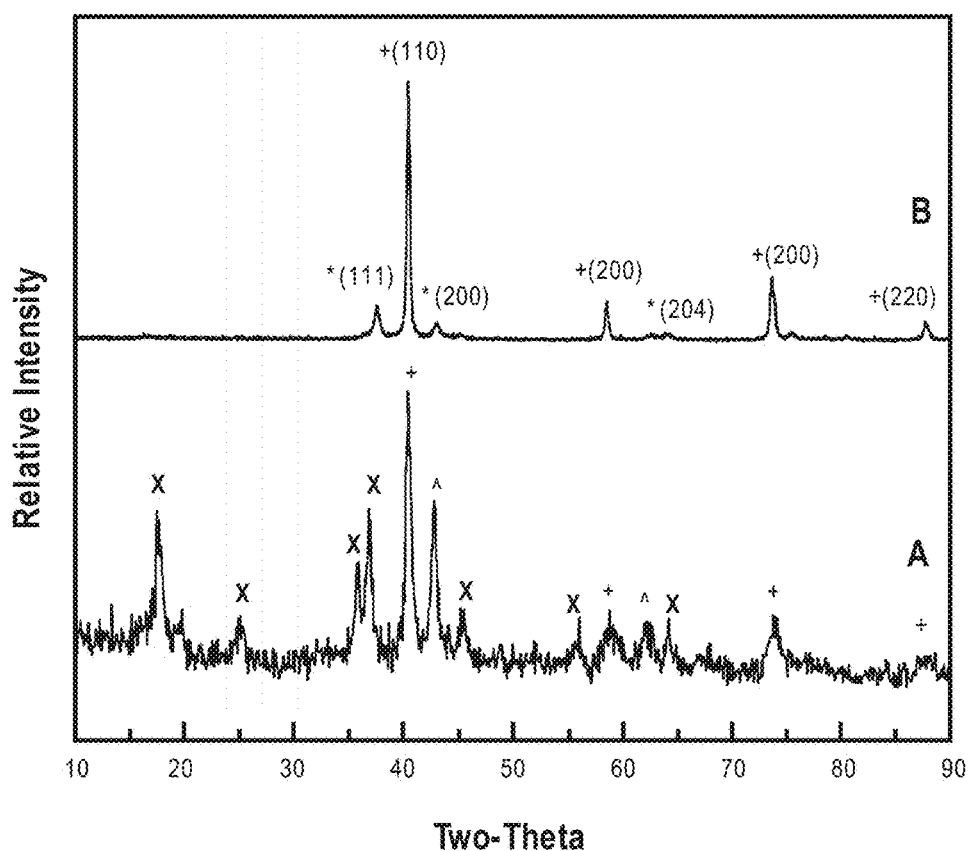
FIG. 7 is XRD patterns showing (A) conversion of $Mg_2(Mo_3O_8)$ to Mo metal in a 1:4 molar flow of N2-H2 at 700° C. for 30 minutes, and (B) conversion of Mg2(Mo3O8) to $\beta$-MoN(1-x) and Mo metal under identical flow conditions at 900° C. for 1 hour, MgO was etched by HCl in the sample shown in (B). All peaks are normalized to the Mo (110) reflection in (A). Reflections of specific phases are denoted as follows: Mg2(Mo3O8) "x", MgO "^", Mo "+", and $\beta$-MoN(1-x) "*".

Initially, the molar ratio of N$_2$—H$_2$ was chosen to be 1:4 at a synthesis temperature of 700° C., modeled after the synthesis of α-MoC$_{(1-x)}$. Under these conditions, it was found that this reactive atmosphere was insufficient for nitride formation of for significant decomposition of Mg$_2$(Mo$_3$O$_8$), where Mo metal was the primary decomposition product observed, shown in FIG. 7 graph A. Temperatures were gradually increased, using a 1:4 molar ratio of N$_2$—H$_2$, until β-MoN$_{(1-x)}$ was observed as a reaction product. At 900° C. Mg$_2$(Mo$_3$O$_8$) was seen to form β-MoN$_{(1-x)}$ as a minor product with Mo metal being the dominant product, FIG. 7, graph B.

Figure 8:
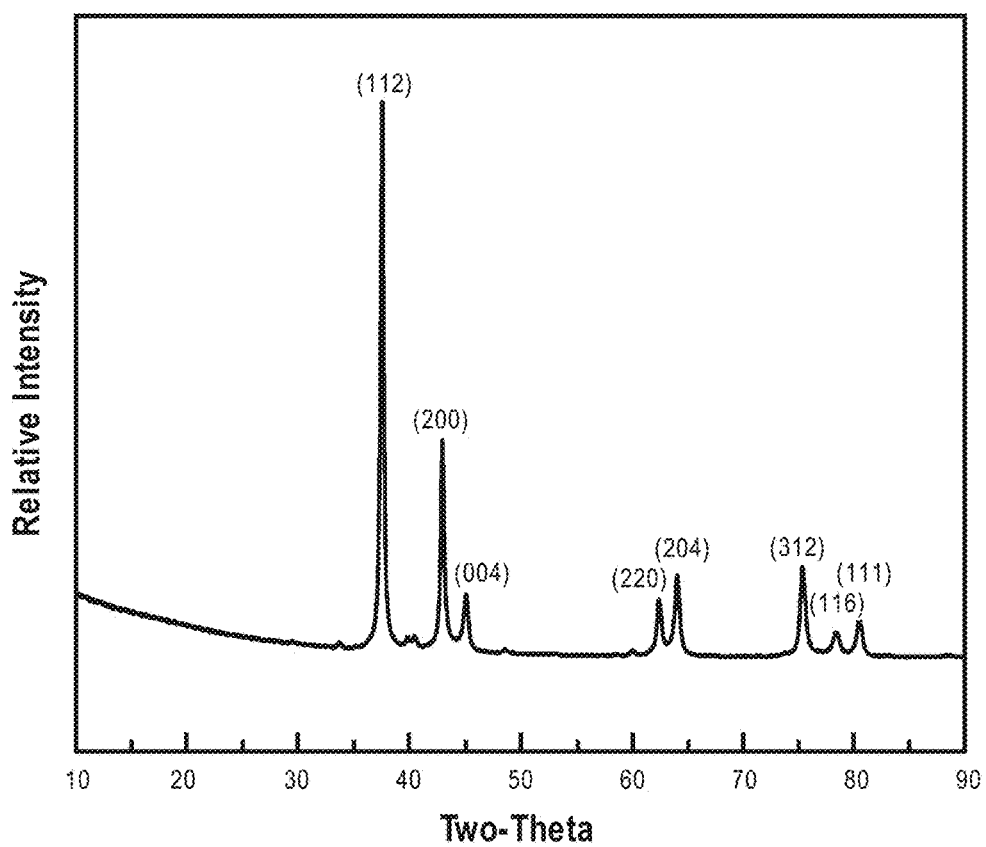
FIG. 8 is XRD patterns showing conversion of Mg2Mo3O8 to Hexagonal $\beta$-MoN(1-x) in a 7:3 molar flow of N2-H2 at 900° C. for 2 hours. Sample was washed in HCl to remove MgO.
Figure 9:
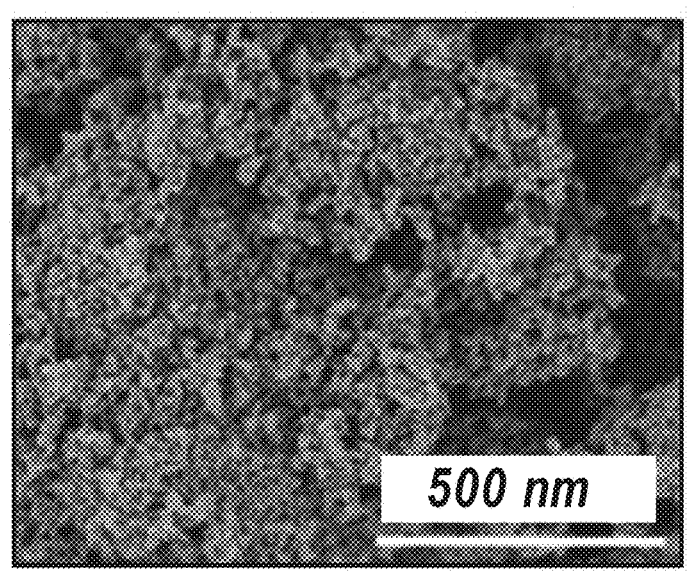
FIG. 9 is an SEM image of $\beta$-MoN(1-x)

Next, the concentration of N$_2$ was gradually increased, at a temperature of 900° C., until the hexagonal phase, β-MoN$_{(1-x)}$, was produced without evidence of Mo metal. This occurred when the molar ratio of N$_2$—H$_2$ used was 7:3 and at a temperature of 900° C. for 2 hours, shown in FIG. 8. After etching MgO in HCl, BET surface area was measured to be ~12 m$^2$/g, where SEM images (FIG. 9) show primary particle sizes on the order of ~50-100 nm. Lower temperatures were explored in attempts to increase surface area by reducing the effects of sintering, however slow rates of conversion and lengthy synthesis durations resulted in the production of metallic Mo. Further experimentation is needed to establish whether the use of Zn(MoO$_4$) as a nitride precursor will allow for lower temperature, shorter synthesis, and the production of higher surface area nitride phases.

Synthesis of α-MoC from (NH$_4$)$_2$Mg(MoO$_4$)$_2$ in Syngas

The co-crystallized product of Mg(MoO$_4$) and (NH$_4$)$_2$(MoO$_4$), (NH$_4$)$_2$Mg(MoO$_4$)$_2$, has been found to decompose to α-MoC$_{(1-x)}$ and β-MoN$_{(1-x)}$ phases more rapidly than Mg(MoO$_4$), described by the following redox reactions:

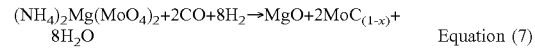
$$(NH_4)_2Mg(MoO_4)_2+2CO+8H_2 \rightarrow MgO+2MoC_{(1-x)}+8H_2O \quad \text{Equation (7)}$$

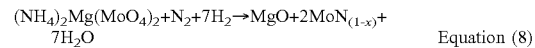
$$(NH_4)_2Mg(MoO_4)_2+N_2+7H_2 \rightarrow MgO+2MoN_{(1-x)}+7H_2O \quad \text{Equation (8)}$$

Equations (7) and (8) are written in a form intended to balance only those species directly involved in the reduction of molybdenum. The N species on the reactant side may be balanced with H$_2$ in stoichiometric proportions not shown.

Figure 10:
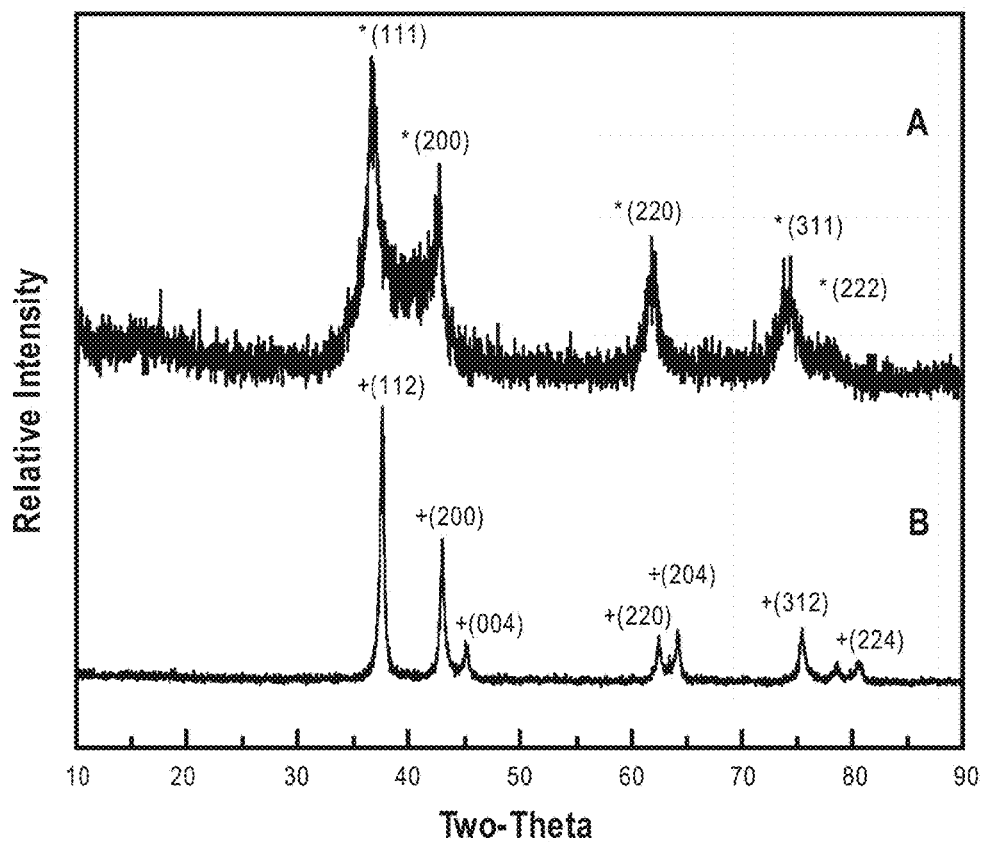
FIG. 10 is XRD patterns showing (A) conversion of $Mg_2(Mo_3O_8)$ to Mo metal in a 1:4 molar flow of $N_2$—$H_2$ at 700° C. for 30 minutes, and (B) conversion of $Mg_2(Mo_3O_8)$ to $\beta$-$MoN_{(1-x)}$ and Mo metal under identical flow conditions at 900° C. for 1 hour, MgO was etched by HCl in the sample shown in (B). All peaks are normalized to the Mo (110) reflection in (A). Reflections of specific phases are denoted as follows: $Mg_2(Mo_3O_8)$ "x", MgO "^", Mo "+", and $\beta$-$MoN_{(1-x)}$ "*".

XRD patterns in FIG. 10 show the reaction products described by Reactions (7) and (8). The rate of α-MoC$_{(1-x)}$ production was found to be approximately twice that which was observed when pure Mg(MoO$_4$) was used, while at a temperature lower by 25° C. This rapid rate of α-MoC$_{(1-x)}$ production is considered an integral factor in the in situ platinum dispersion method described below. More notably, β-Mo$_2$N was prepared at 750° C., a temperature 150° C. lower than the minimum nitriding temperature attainable using pure Mg(MoO$_4$).

Figure 11:
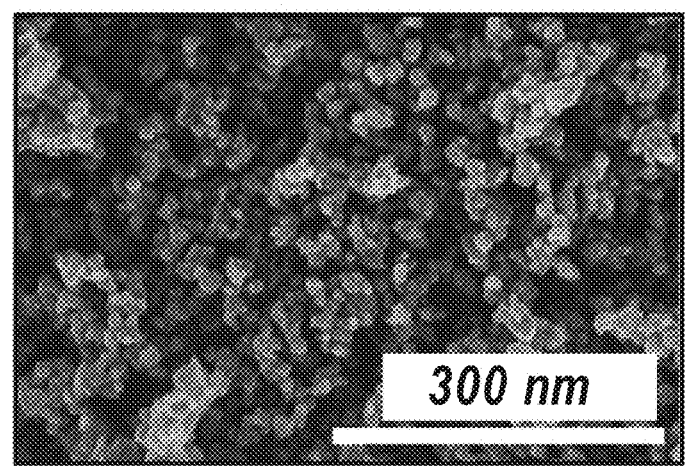
FIG. 11 is an SEM image of $\alpha$-MoC(1-x) prepared the reaction (NH4)2Mg(MoO4)2 in a 1:4 molar flow of Co—H2 at 675° C. for 1.5 hours. MgO was etched by HCl.

The SEM image in FIG. 11 shows a similar morphology as the materials obtained by the method described earlier, with average particle sizes on the order of ~30 nm. The surface area of α-MoC$_{(1-x)}$ prepared by this method was measured by BET analysis to be ~32 m$^2$/g. This result is consistent with the observed particle size.

In Situ Synthesis of PtMo$_z$/α-MoC$_{(1-x)}$

Figure 12:
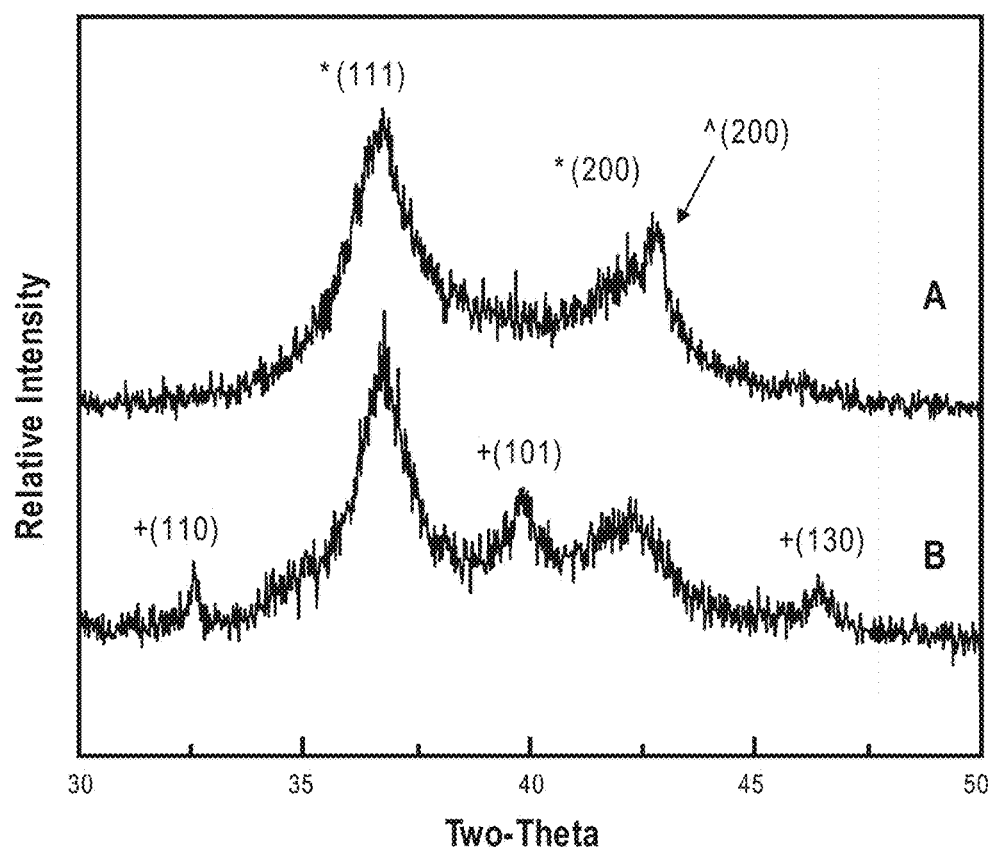
FIG. 12 is XRD patterns showing the reaction products of (A) the precipitated product of $(NH_4)_2Mg(MoO_4)_2$ and $Mg(MoO_4)$ in an excess of $NH_4(OH)$ and (B) $(NH_4)_2Mg(MoO_4)_2$ and $Mg(MoO_4)$ crystallized from solution without precipitation in $NH_4(OH)$. (MgO in the catalyst shown in (A) was not etched by HCl)

For the in situ synthesis of PtMo$_z$/α-MoC$_{(1-x)}$, H$_2$(PtCl$_6$) and (NH$_4$)$_2$Mg(MoO$_4$)$_2$ were found to form an amorphous white solid when an aqueous solution of the two compounds were precipitated using an excess of NH$_4$(OH). This amorphous compound is likely a co-precipitated product of (NH$_4$)$_2$Mg(MoO$_4$)$_2$ and (NH$_4$)$_2$(PtCl$_6$), although the exact nature of this compound remains undetermined. When heat treated under the carbiding conditions described previously, this amorphous compound was found to decompose to a platinum containing α-MoC$_{(1-x)}$ composite material. There was no metallic Pt or PtMo$_z$ phases observed in XRD, shown in FIG. 12. The theoretical platinum loading of 8 wt % was consistent with X-ray fluorescence measurements (XRF) showing an actual loading of ~7.5 wt % Pt. These results suggest the presence of highly dispersed PtMo$_z$ phases.

Cyclic voltammetry in deaerated 0.1M HClO$_4$, however, showed no evidence of platinum oxidation/reduction, H$_2$ underpotential deposition (UPD), or H$_2$ adsorption/stripping (HAD) peaks suggesting the absence of catalytically active Pt surface species. RDE experiments in O$_2$ saturated 0.1M HClO$_4$ revealed no cathodic activity and confirmed this material to be catalytically inert for ORR.

Catalyst Activation by CO Surface Treatment

Figure 13:
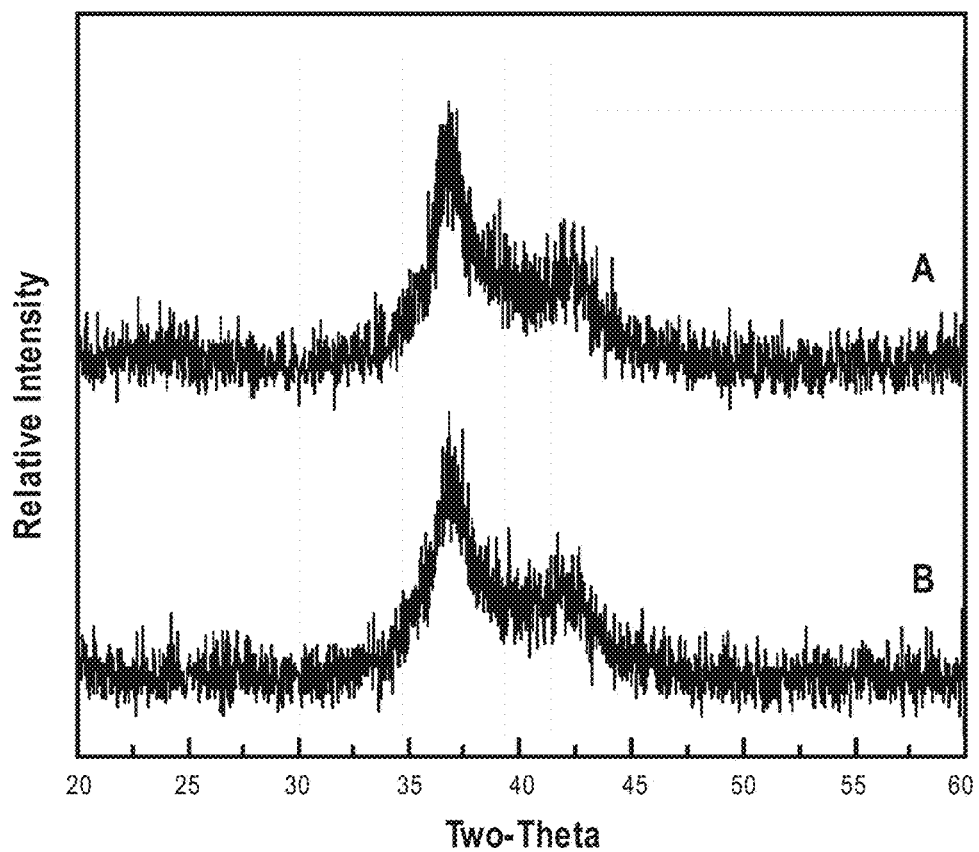
FIG. 13 is XRD patterns showing 8 wt % Pt/$\alpha$-$MoC_{(1-x)}$ prepared from the precipitate formed by the reaction of $H_2(PtCl_6)$ and $(NH_4)_2Mg(MoO_4)_2$ in $NH_4(OH)$. Samples were treated in a 1:4 molar ratio of CO—$H_2$ at 675° C. for 1 hour followed by a surface treatment in pure CO for 2 hours at (A) 650° C., XS=~6.8 nm and (B) 450° C., XS=~5.3 nm.

Since the as produced catalyst was found to be inactive for ORR, an activation procedure was developed involving a surface treatment in pure CO directly following the thermal synthesis of the composite material in syngas (1:4 ratio of CO—H$_2$). The use of CO as an adsorbate which can induce the segregation of certain species within an alloy have been reported, typically applied to platinum by electrochemical adsorption of CO in saturated electrolyte [41]. Although electrochemical adsorption of CO was attempted to activate Pt phases within these materials, this was only found to have limited effect. A thermal method was attempted in which samples were cooled from the synthesis temperature of 675° C. to a slightly lower temperature, ranging from 450° C. to 650° C., where the CO surface treatment would be administered. Once the new target temperature was reached the feed was switched to a pure CO atmosphere. Samples were then treated for an additional 2 hours under these conditions. XRD patterns for the catalysts prepared after the surface treatment, FIG. 13, show no evidence of Pt or PtMo$_z$ phases found in the region between 36°-40° in two-theta, the region where the (111) reflections of these species would be observed. A subtle decrease in the peak width at half maximum for the (111) reflection of α-MoC$_{(1-x)}$ was found with increasing surface treatment temperature, being most pronounced for samples treated at 650° C. This result is attributed grain coarsening due to high temperature sintering of the α-MoC$_{(1-x)}$ domains. Crystallite domain size (XS) was calculated using whole pattern refinement in MDI JADE analytical software, where the domains were calculated to be approximately 1.5 nm larger for the sample treated in CO at 650° C. compared to the sample treated at 450° C.

Electrochemical Characterization

Figure 14:
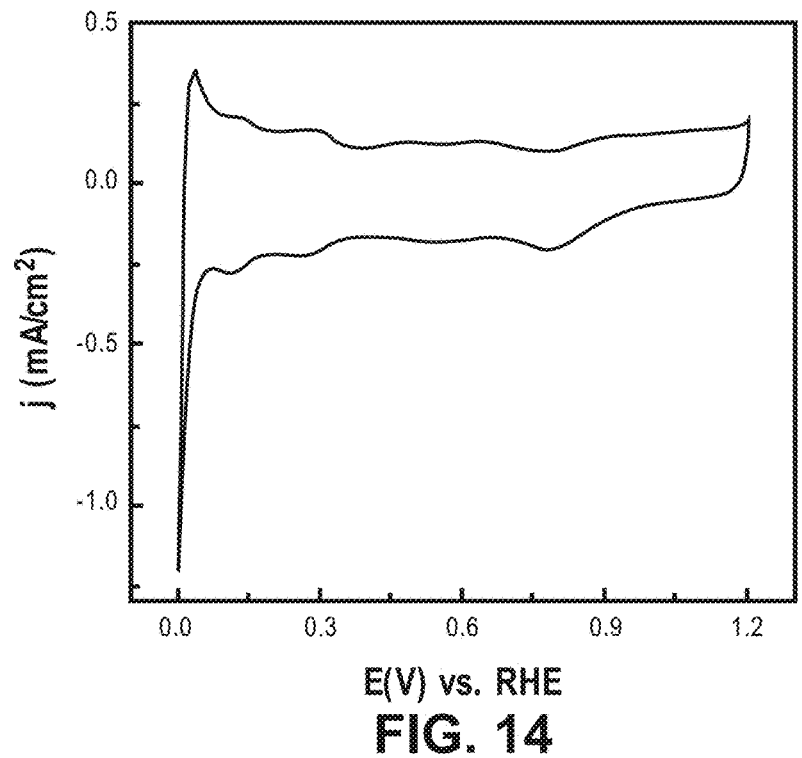
FIG. 14 is a Cyclic voltammogram at 100 mV/s of 8 wt % Pt/α-MoC$_{(1-x)}$ in deaerated 0.1M HClO$_4$ after CO surface treatment at 650° C. for 2 hours.

Following the CO surface treatment, these materials were found to possess characteristic Pt features in cyclic voltammetry, including: H$_2$ UPD, H$_2$ adsorption, and H$_2$ stripping when cycled in N$_2$ saturated perchloric acid, FIG. 14. Using the H$_2$ adsorption peak from CV data, the electrochemical surface area was calculated from the following equation:

$$ECSA = \frac{Q_{Pt}}{210\frac{\mu C}{cm^2_{Pt}} \times L} \quad \text{Equation (9)}$$

Here, $Q_{pt}$ is the charge density calculated by the integration of the HAD peak (C/cm$^2$), 210 is the charge required to reduce a monolayer of protons on the electrode, and L is the catalyst loading on the electrode (g$_{pt}$/cm$^2$).

Figure 15:
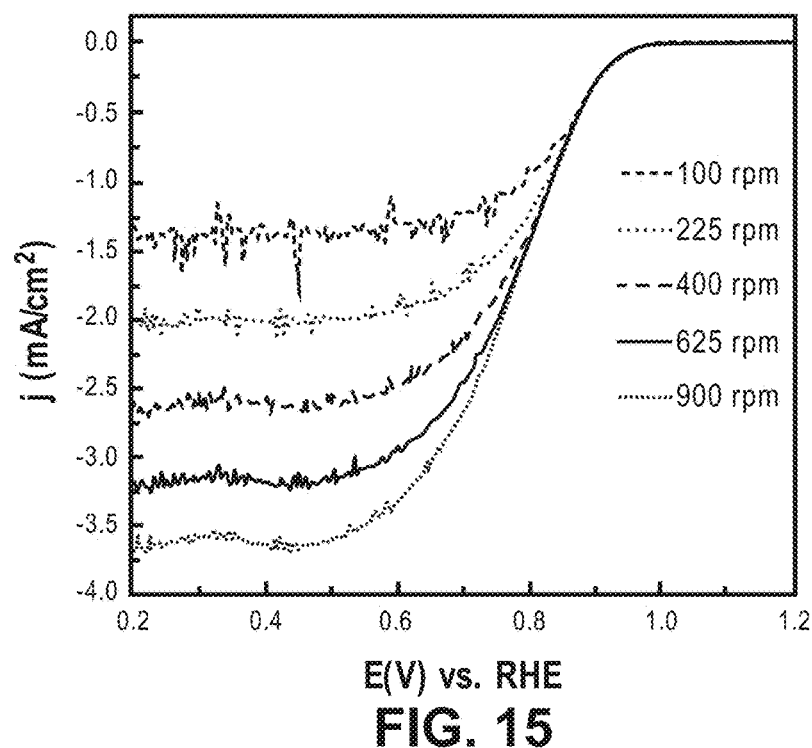
FIG. 15 is RDE measurements at 5 mV/s in O$_2$ saturated 0.1M HClO$_4$ for Pt/α-MoC$_{(1-x)}$ following CO surface treatment at 650° C. for 2 hours.

From this, it was found that samples treated in CO at 650° C. had an ECSA of ~36 m$^2$/g$_{pt}$, indicating significant development of catalytic surface area as a direct result of the surface treatment in CO. ORR activity was measured using RDE experiments in a half cell configuration with O$_2$ saturated 0.1M HClO$_4$ at 100, 225, 400, 625, and 900 RPM at a scan rate of 5 mV/s (FIG. 15). The half wave potential, $E_{1/2}$, was calculated as the potential corresponding to 50% of the diffusion limited current, found to be 0.78 V vs RHE. The corresponding onset potential was found to be 1.01 V vs RHE, an approximate overpotential of 50-100 mV for ORR when compared to values typically reported for that of platinum supported on carbon black [42-45].

The Levich equation was used to estimate the number of electrons in the reaction transfer mechanism, ~3.8 e$^-$, calculated from the mass transfer limited current density, j$_L$:

$$n = \frac{j_L \nu^{(1/6)}}{0.62 F D^{(2/3)} \omega^{(1/2)} C_{CO_2}}$$

where j$_{Lev}$ is the limited current density (A/cm$^2$), ν is the kinematic viscosity of the electrolyte solution (St), F is the Faraday constant (C/mol), D is the diffusion coefficient for O$_2$ in the electrolyte (cm$^2$/s) ω is the angular frequency of the electrode (rad/s), and C is the concentration of O$_2$ in the electrolyte (mol/cm$^3$). Additionally, the platinum mass activity, i$_m$, was calculated from RDE data using the following equation corrected for the mass transfer limited current density:

$$i_m = \frac{j_L \times j}{(j_L - j) \times L}$$

Figure 16:
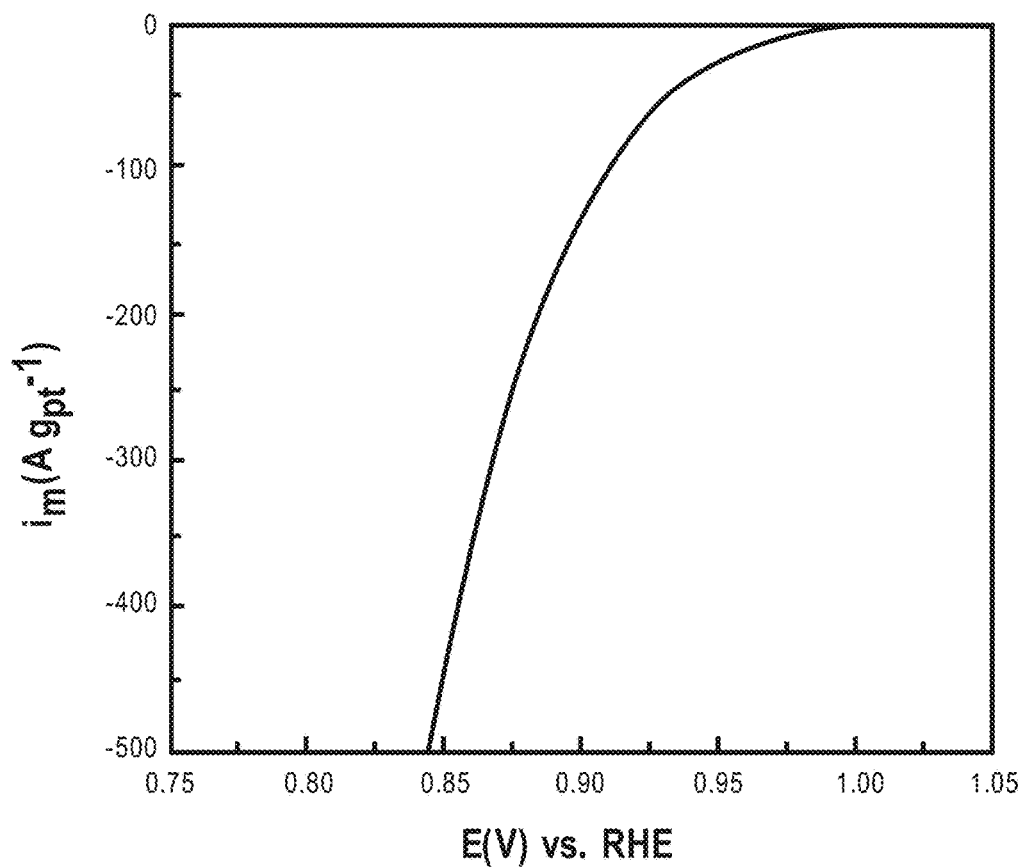
FIG. 16 shows platinum mass activity calculated from RDE data at 900 RPM and a scan rate of 5 mV/s in O$_2$ saturated 0.1M HClO$_4$ for Pt/α-MoC$_{(1-x)}$ following CO surface treatment at 650° C. for 2 hours.

The result is shown in FIG. 16 for data collected at 900 RPM, were the mass activity evaluated at 0.9 V vs RHE was found to be ~137 A/g$_{pt}$. Again, this result is consistent with values of mass activity for Pt/C$_{black}$ commonly reported [39-40].

XPS Analysis

Although bulk composition of the catalyst was seen to be unaffected by the CO surface treatment, substantial development in catalytic activity and surface area confirms either morphological or chemical changes in the surface environment of the α-MoC$_{(1-x)}$ supported PtMo$_z$ composite phases, however subtle these changes may be. To investigate the effect of surface treatment temperature, four catalysts were prepared and characterized using XPS surface analysis where the surface treatment temperatures were incremented as follows: 450° C., 550° C., 600° C., and 650° C. All samples were treated for the same duration, 2 hours, in pure CO.

Figure 17A:
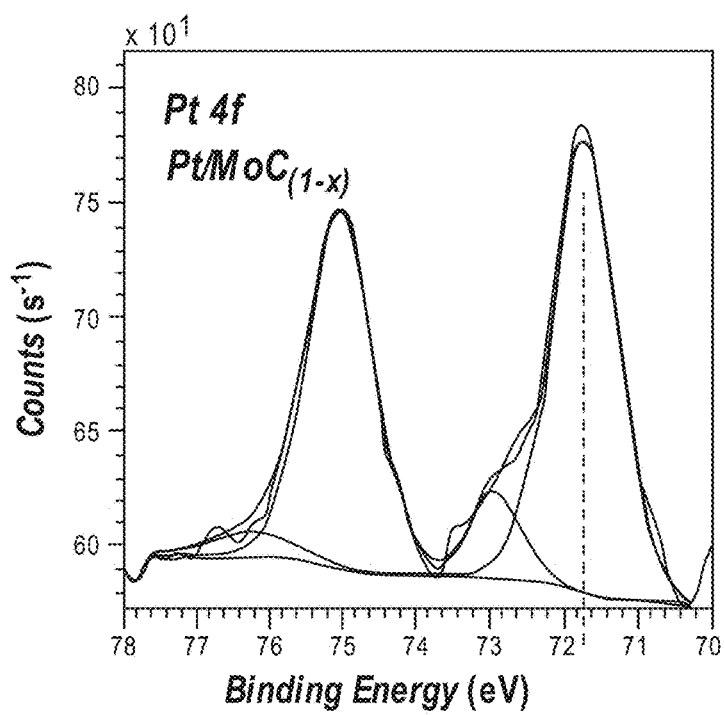
FIG. 17A-17D are XPS spectra showing the binding energies of the Pt 4f orbital (FIGS. 15A and B) and C is orbital (FIGS. 15C and D).
Figure 17B:
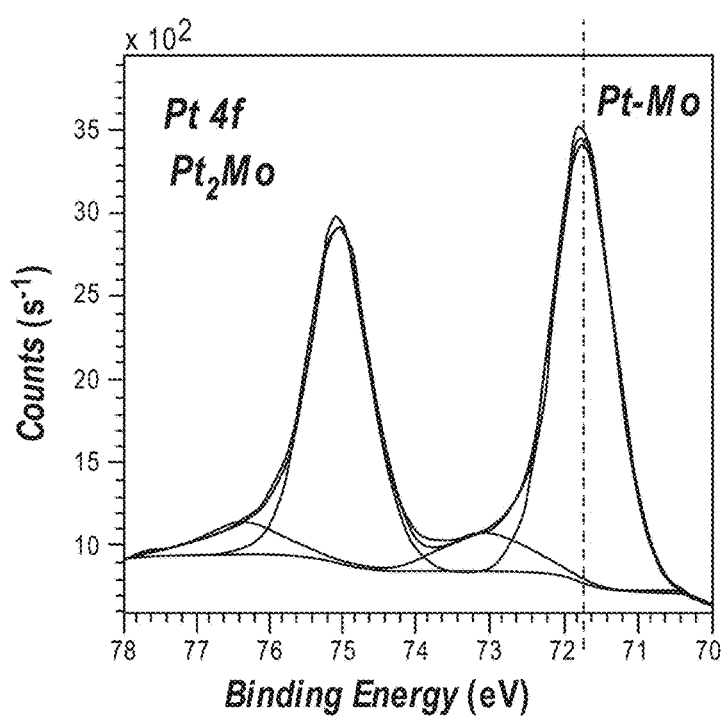

Platinum 4f binding energies were compared to a $Pt_2Mo$ reference prepared by the high temperature reduction of $MoO_2$ and $H_2(PtCl_6)$, shown in FIGS. 17A and 17B respectively. The platinum environment for the 8 wt % Pt/α-$MoC_{(1-x)}$ catalysts CO treated at temperatures from 450° C. to 650° C. were found to be similar to the Pt environment of the $Pt_2Mo$ reference, with a dominant binding energy of 71.8 eV. The absence of a Pt—Pt binding energy, typically found near 71.2 eV for bulk Pt materials, suggest the presence of $PtMo_z$ intermetallic and solid solution phases by direct comparison of the $Pt_2Mo$ reference. The dominant Pt 4f binding energy and corresponding distributions were found to remain relatively constant with increased CO treatment temperature. However, it is possible that the only observed Pt 4f binding energy, 71.8 eV, is a result of platinum oxide, $Pt^{2+}$, where a monolayer of platinum oxide is responsible for the observed binding energy. This would suggest that the similarity in the Pt 4f binding energies of the 8 wt % Pt/α-$MoC_{(1-x)}$ catalyst and the $Pt_2Mo$ reference is coincidental and not evidence that the two materials are of similar or identical composition [46].

Figure 17C:
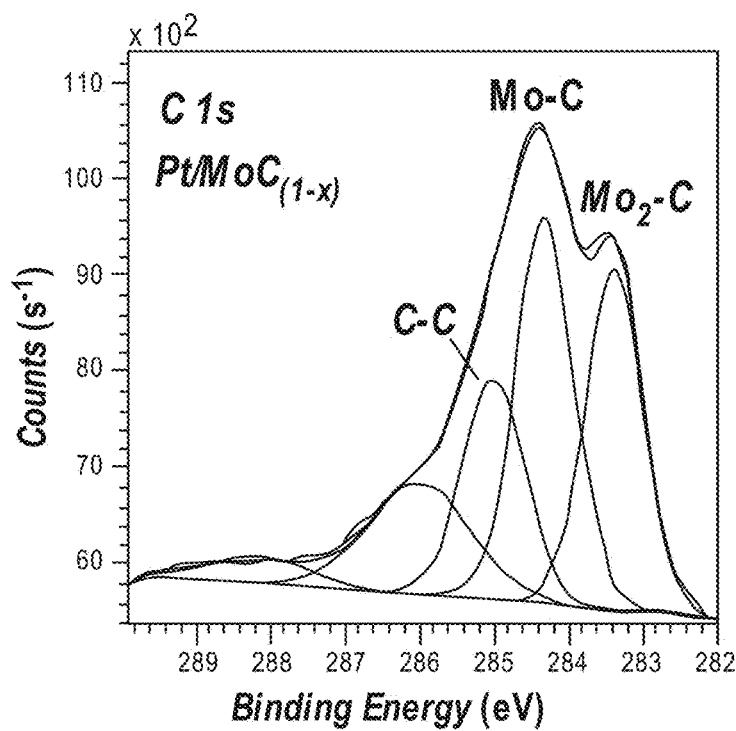
Figure 17D:
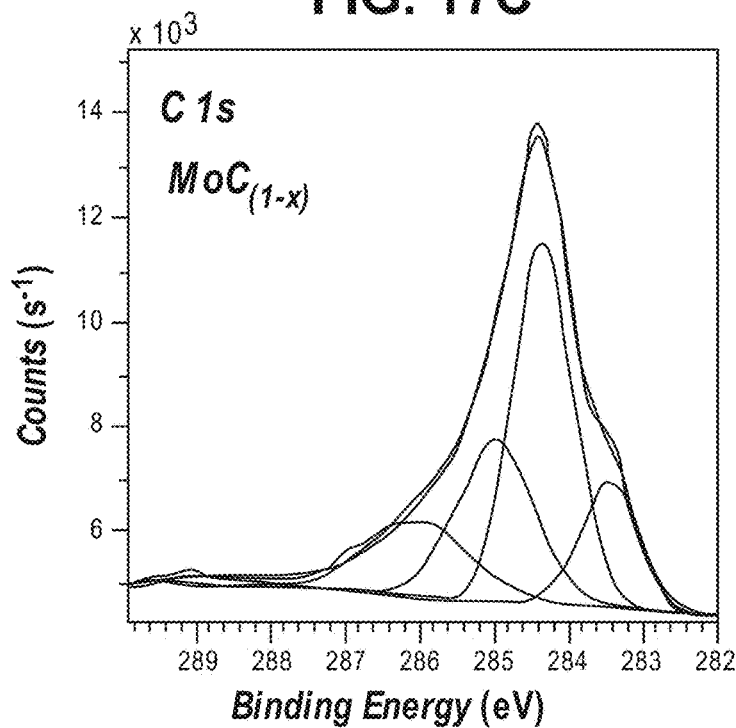
Figure 18:
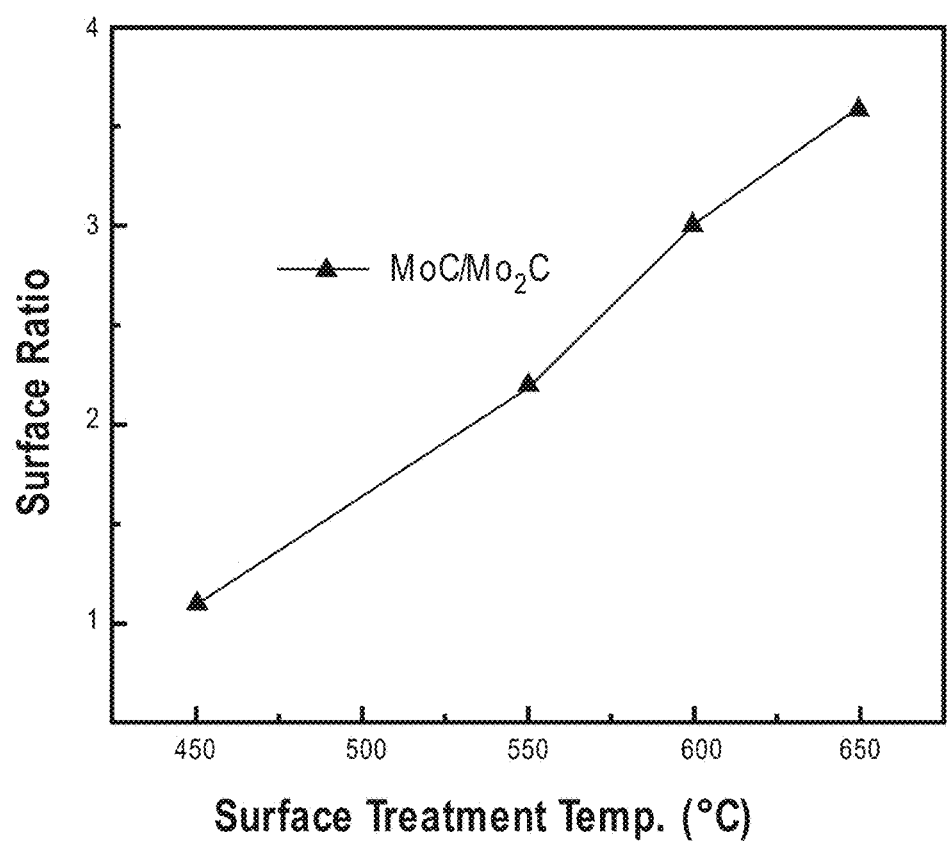
FIG. 18 shows the ratio of MoC to Mo$_2$C on the surface of 8 wt % Pt/MoC$_{(1-x)}$ as a function of CO surface treatment temperature calculated from XPS spectra of carbon is binding energies.

Analysis of the C 1s spectra, FIGS. 17C and 17D, revealed a trend correlating the C—Mo ratio as a function of increasing surface treatment temperature. FIG. 18 plots the ratio of MoC to $Mo_2C$ calculated from the C is spectra, deconvoluted into the XPS spectra for MoC, $Mo_2C$, and C—C, as a function of surface treatment temperature.

TEM Analysis

Figure 19A:
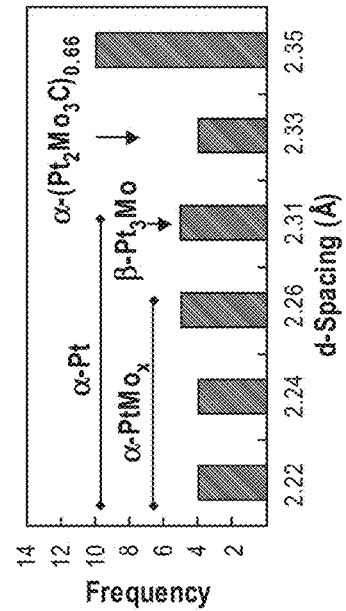
FIG. 19A-D are TEM images and corresponding histograms showing the distribution of Pt and PtMo$_z$ phases.
Figure 19B:
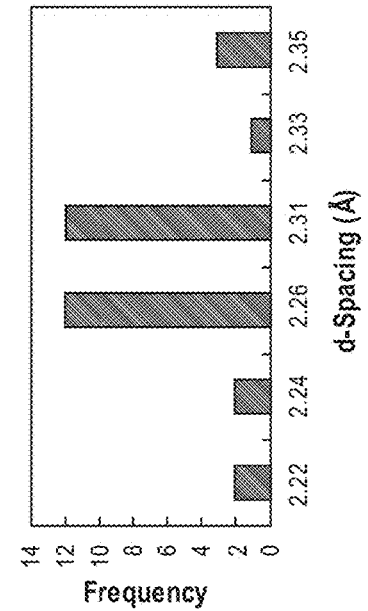
Figure 19C:
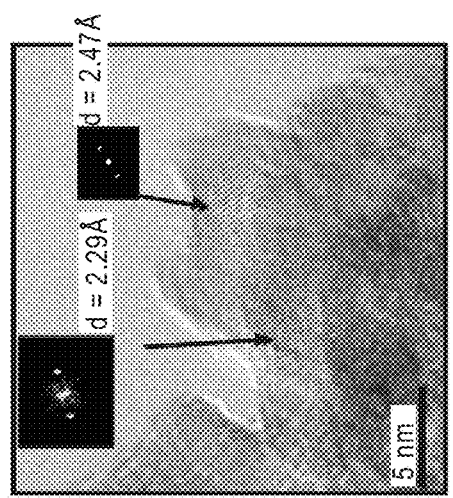

TEM analysis, shown in FIGS. 19A and 19C, reveals crystallite domains for α-$MoC_{(1-x)}$, as well as various platinum phases of various domain size, on the approximate order of 5-10 nm. The observed polycrystalline particle structure is consistent with XRD observations of particle domain size. To confirm the existence of specific $PtMo_z$ phases, lattice fringes (FIGS. 19B and 19D) were indexed using spot diffraction patterns created by Fourier Form Transform using GATAN Digital Micrograph software. Lattice d-spacings were indexed in the region of 2.22 Å to 2.35 Å due to the increased resolution between (111) reflections of α-Pt phases, the (210) reflection of cP α-$PtMo_z$ phases, (111) reflections of the cF α-$PtMo_z$, and the (111) reflection of the tetragonal $PtMo_z$ phase found in this region. Additionally, this is the region in which the 100% lines of these phases, again typically the (111) reflections, would be observed in XRD.

The results show that prior to the CO surface treatment there was a broad distribution of Pt and/or $PtMo_z$ phases observed, with a majority concentrated in the region of 2.26 Å and 2.31 Å. Identification of specific phases was not possible due to a large overlap in the d-spacing of various Pt and $PtMo_z$ phases in this region, a result of the isostructural nature of these materials. Following the CO surface treatment, the distribution of $PtMo_z$ phases was found to be spread more broadly throughout the entire region. Although there is no clear evidence of a shift from one phase in particular to another, it is clear that the CO surface treatment is inducing a redistribution of the $PtMo_z$ phases. It is hypothesized that this redistribution results in the exposure of certain Pt or $PtMo_z$ facets on the surface of the material. This result is consistent with the development of catalytic activity confirmed by CV measurements, where catalytic activity is strictly a surface phenomenon.

Figure 19D:
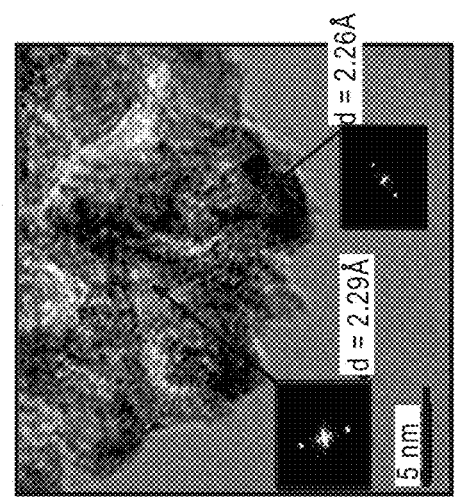

Evidence of a ternary Pt—Mo—C phase can also be found in the region of 2.33 Å, corresponding to a lattice parameter too large to be associated with any cubic Pt or $PtMo_z$ compound published in various crystal structure databases, as shown in FIGS. 19B and 19D. The preparation of this particular ternary phase is consistent with the direct high temperature reaction of the constituent species [47]. This phase was found in slightly higher concentrations following the CO surface treatment, yet it is unclear if this phase contributes to the developed catalytic activity resulting from the surface treatment.

The most significant observation found in the materials following the CO surface treatment is the formation of a phase with the corresponding d-spacing of 2.35 Å. This phase is attributed to the reflection of hexagonal β-$MoC_{(1-x)}$, a transition within the molybdenum carbide species which may be related to the segregation of carbide and $PtMo_z$ phases. This determination is supported by XRD analysis which reveals no bulk shift from cubic to hexagonal β-$MoC_{(1-x)}$, which when compared to TEM analysis suggests an extent of phase transition within the carbide phase on the same order as the transitions within the $PtMo_z$ phases.

Synthesis of $Mo_2N$

Figure 20:
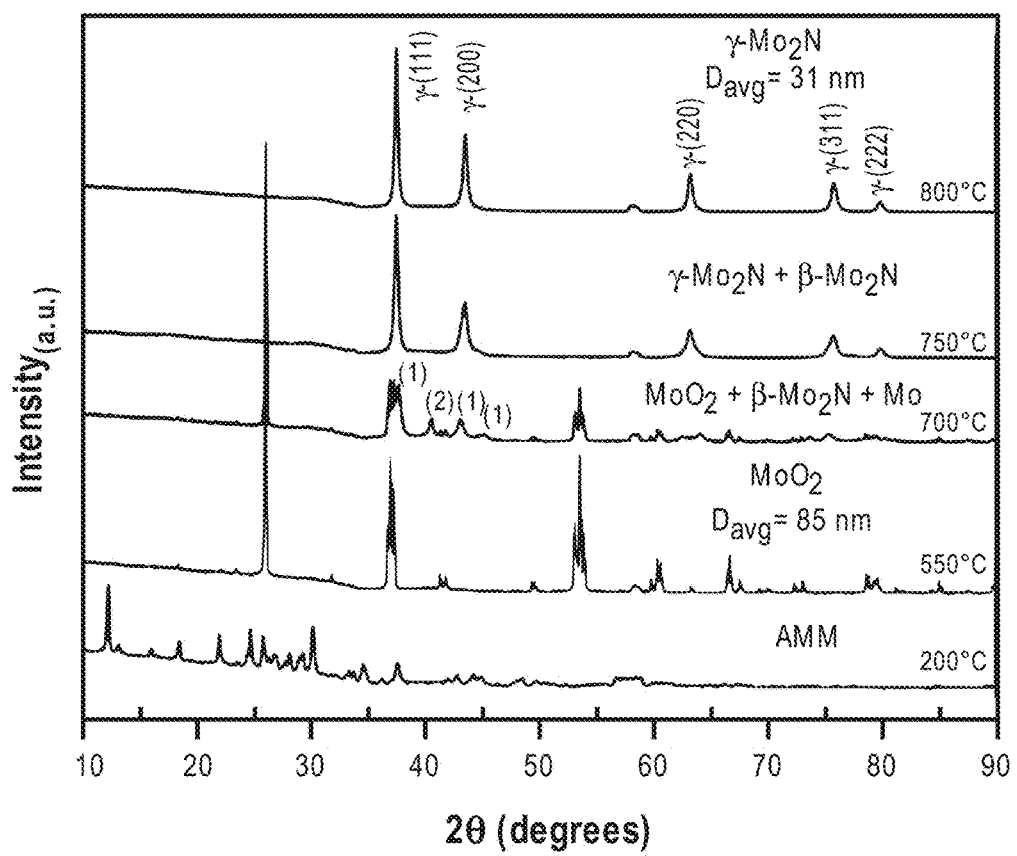
FIG. 20 shows in situ decomposition of AHM in 7 at. % H$_2$ N$_2$-balance. Peak intensities are not scaled to show composition and peak intensity relative to the initial and final products.

To investigate the decomposition pathway of three $Mo_2N$ precursors (AHM, AMM, and $MgMoO_4$) an identical mole-number of Mo (~0.1 g of precursor) was loaded into the Anton PAAR high temperature sample stage. The sample stage was purged in forming gas (7 at. % $H_2$, $N_2$-balance) and a temperature profile was run. The temperature profile began at 100° C. and in increments of 50° C. ended at 800° C. The ramp rate between each temperature set point used was 50° C./min. A diffraction pattern was collected at each temperature interval, both once the set point temperature was reached and again after the temperature was held for 1 hr. The total duration of the experiments was ~22 hours. The results are shown in FIG. 20.

Bulk Synthesis of $Mo_2N$ $Mo_2N$ was prepared from three precursors: AHM, AMM, and $MgMoO_4$, in forming gas without temperature programmed reduction. Again, an identical mole-number of Mo (~0.3 g of precursor) was loaded into 15 mL porcelain combustion boats and placed in a two inch diameter quartz tube. The quartz tubes were then loaded into a two foot, single zone, tube furnace and fitted with ultra-torr inlet and outlet fittings. A flow rate of 200 sccm was used and once the reactor was purged in the $H_2$—$N_2$ mixture the furnace was ramped at 15° C./min to 800° C. Once the set-point was reached the temperature was held for 3 hours. The reactor was then cooled to ambient temperature and purged in argon. Next, the reactor was flushed with 1% $O_2$ He-balance and the nitride samples were passivated for ~1-2 hours.

For samples prepared using AMM and $MgMoO_4$, an additional etch in HCl (—10 M) was required to leach MgO. Samples were added to the HCl etch, sonicated in a sonobath for ~1 hour, followed by centrifuging and rinsing in DI water until a neutral pH was reached. The samples were then rinsed in methyl alcohol two times to displace water, allowing for more rapid drying. Samples were then dried by a gentle stream of $N_2$ gas, and then placed in a vacuum (~30 inHg) for several hours.

Synthesis of $Mo_2N$ Using Sacrificial Support Method

The procedure for the bulk synthesis of $Mo_2N$ was followed with the addition of excess MgO added to each precursor. The precursor (~0.3 g) was dissolved in ~15 mL of DI water. Separately, 0.3 g of MgO (UBE) was dispersed in ~25 mL of DI water and sonicated for several minutes. The precursor was then added to the colloidal MgO and allowed to dry at ~150° C. in air. The resulting powders were ground using a mortar and pestle and treated under the reaction conditions described previously. Additionally, the sacrificial support method was used to make α-$Mo_2C$ by following identical procedures. The reactive atmosphere used in the carbide synthesis was a mixture of 20 at. % CO with a $H_2$ balance. The furnace again was ramped at 15° C./min but to 700° C. and held for 3 hours. All products were then etched in HCl to remove MgO and dried accordingly.

X-Ray Diffraction

Figure 21:
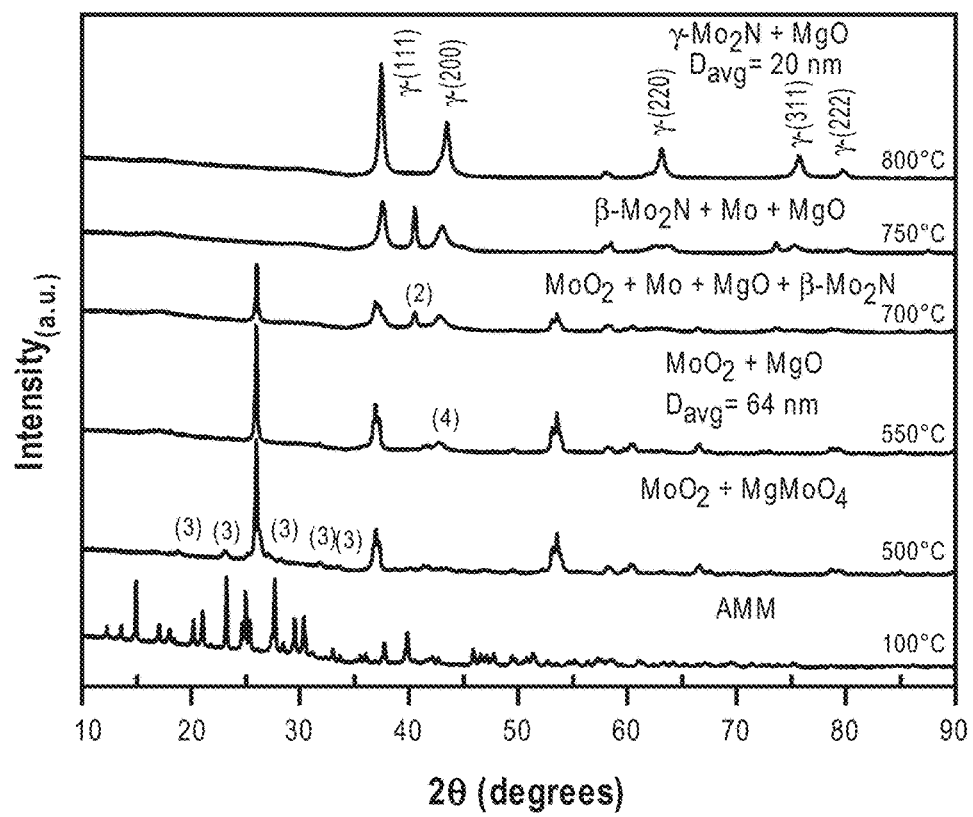
FIG. 21 shows in situ decomposition of AMM in 7% H$_2$ N$_2$-balance. Peak intensities are not scaled to show composition and peak intensity relative to the initial and final products.

Three Mo precursors were selected based on varying ratios of Mg:Mo; AHM (0:1), AMM (1:2), and MgMoO$_4$ (1:1). These precursors were decomposed and studied in situ by XRD to identify: reaction intermediates, the onset temperature of intermediate formation, temperature of intermediate phase decomposition, and the average domain size of the products, Mo$_2$N. In the following figures, intermediate phases labelled (1-5) are identified only at their onset strictly as a visual aid. These labels are not intended to illustrate phase identification for the entire diffraction pattern. FIG. 21 shows temperatures of interest for the decomposition of AHM in forming gas.

Figure 23:
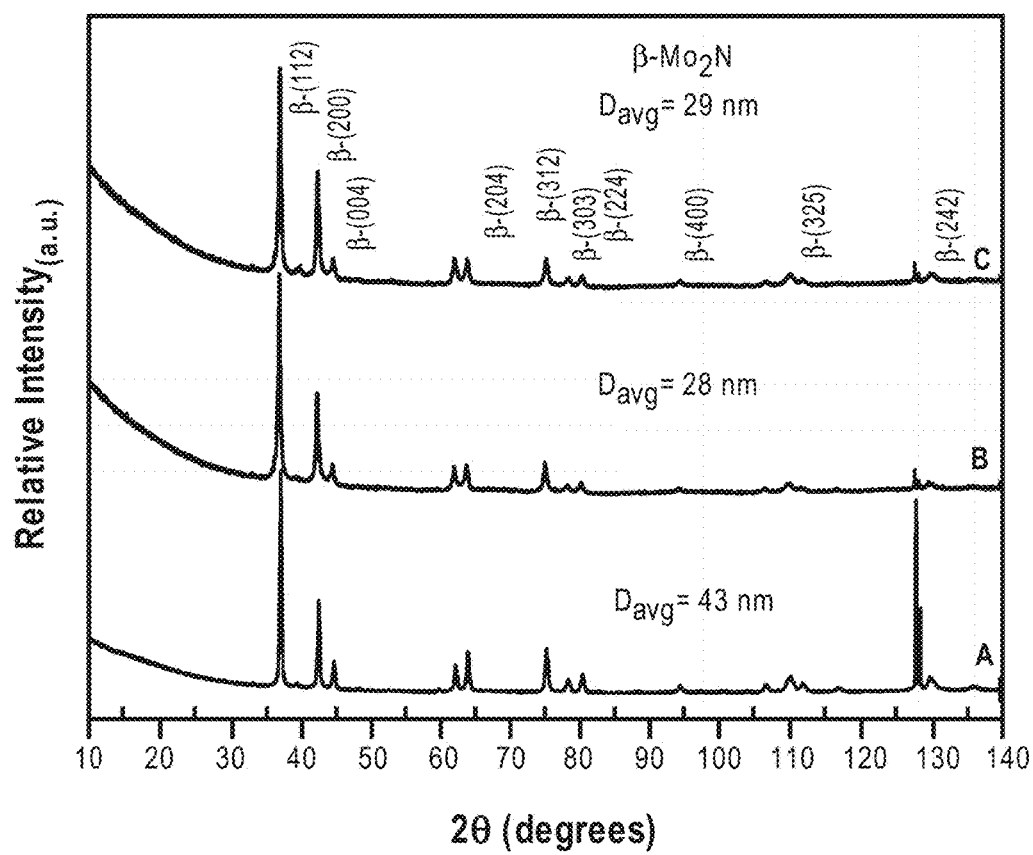
FIG. 23 shows XRD data for β-Mo2N prepared by the bulk method from A) AHM, B) AMM, and C) MgMoO$_4$.

AHM, with Mo initially hexavalent, was seen to reduce to the tetravalent species, MoO$_2$, with complete conversion of AHM occurring after ~1 hr at 550° C. (See FIG. 23 for phase identifiers labeled 1-5). Extensive grain growth of the intermediate MoO$_2$ was evident, resulting in an average domain sized of 85 nm. Further treatment at temperatures greater than 550° C. produced a mixture of Mo and Mo$_2$N, where a low temperature phase (tetragonal β-Mo$_2$N) was formed beginning at 700° C. with complete conversion to the high temperature phase (cubic γ-Mo$_2$N) after ~1 hour at 800° C.

Figure 22:
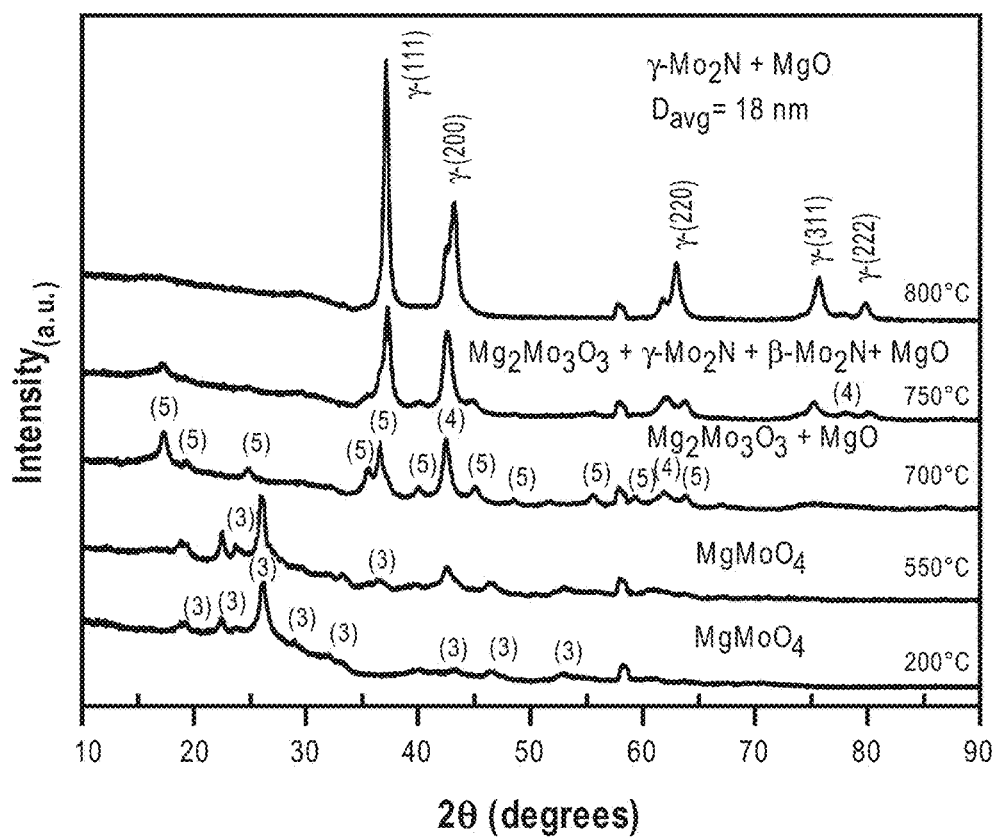
FIG. 22 shows in situ decomposition of MgMoO$_4$ in 7% H$_2$ N$_2$-balance. Peak intensities are not scaled to show composition and peak intensity relative to the initial and final products.

AMM, FIG. 22, was found to decompose rapidly above 100° C. forming a mixture MoO$_2$ and MgMoO$_4$ by 500° C. MgMoO$_4$ then decomposed to MgO+MoO$_2$ in the presence of excess MoO$_2$ at 550° C., an unexpected result considering MgMoO$_4$ can be prepared by the calcination of MoO$_3$ and MgO at similar temperatures. This result is attributed to a large miscibility gap for MoO$_3$ and MgMoO$_4$ (100-66 mol % MgMoO$_4$) as shown in the MoO$_3$—MgMoO$_4$ phase diagram [25]. The average domain size of MoO$_2$ at this temperature, 65 nm, is significantly less than the domain size of MoO$_2$ obtained by AHM decomposition. Mo$_2$N was formed, beginning with the β-phase, again at 700° C. along with Mo metal. Complete conversion to γ-Mo$_2$N was reached after ~1 hr at 800° C.

Figure 24:
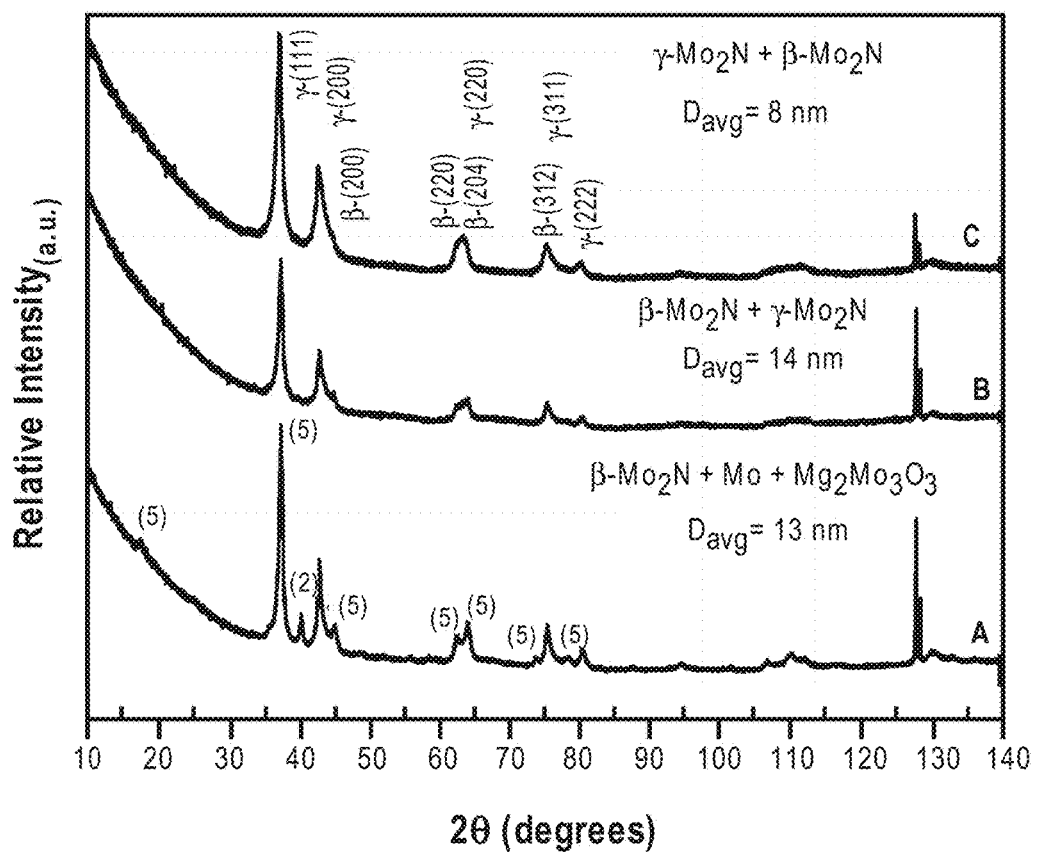
FIG. 24 shows XRD data for Mo$_2$N prepared by the SSM method from A) AHM, B) AMM, and C) MgMoO$_4$.

The synthesis of Mo$_2$N was carried out in bulk to determine the resulting particle domain size without temperature programmed reduction. The results are shown in FIG. 24.

Figure 25:
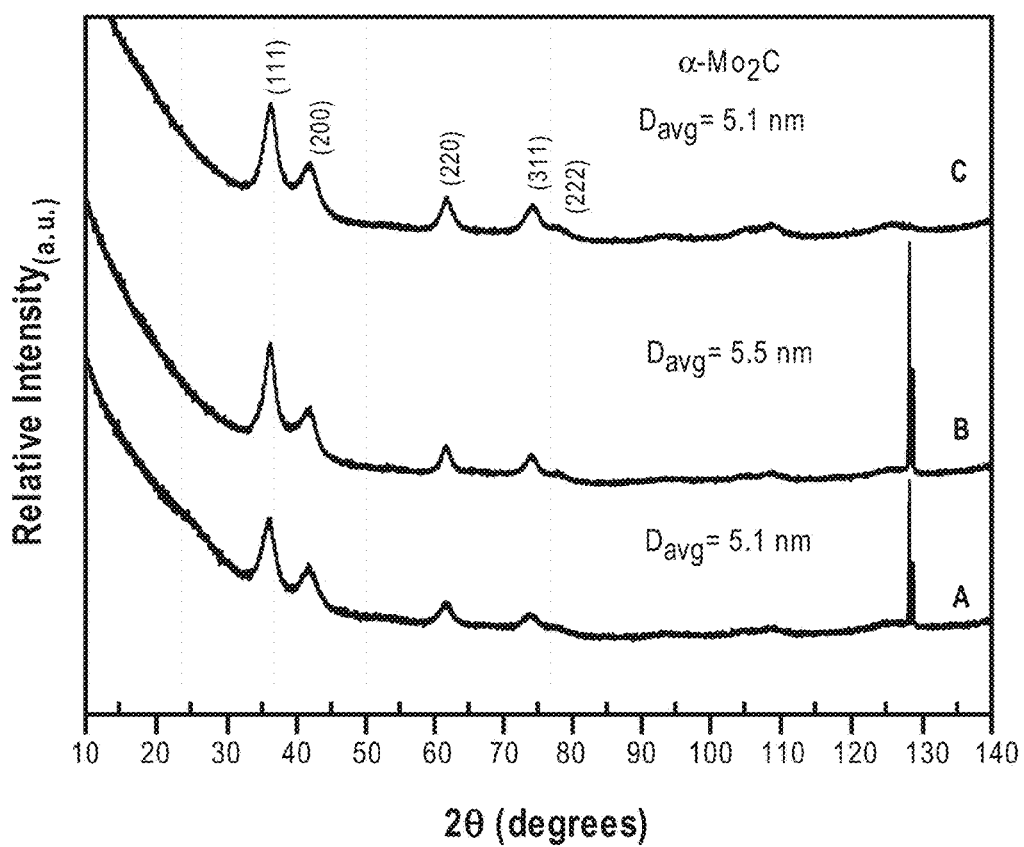
FIG. 25 shows XRD data for α-Mo$_2$C prepared the SSM method from A) AHM, B) AMM, and C) MgMoO$_4$.
Figure 26A:
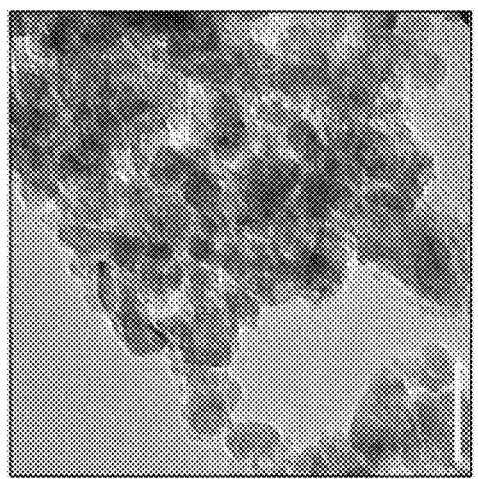
FIG. 26A is an HRTEM image for Mo$_2$N prepared by the SSM method with MgMoO$_4$.
Figure 26B:
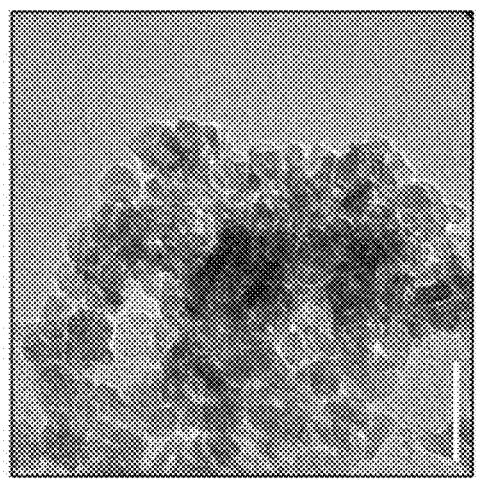
FIG. 26B is an HRTEM image for Mo$_2$N prepared by the SSM method with MgMoO$_4$.
Figure 26C:
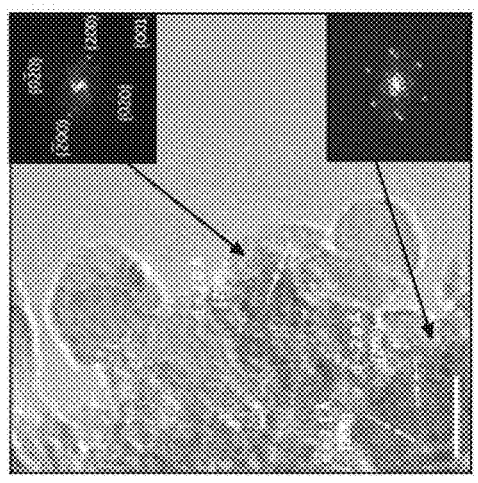
FIG. 26C is an HRTEM image for α-Mo$_2$C prepared by the SSM method with MgMoO$_4$.
Figure 26D:
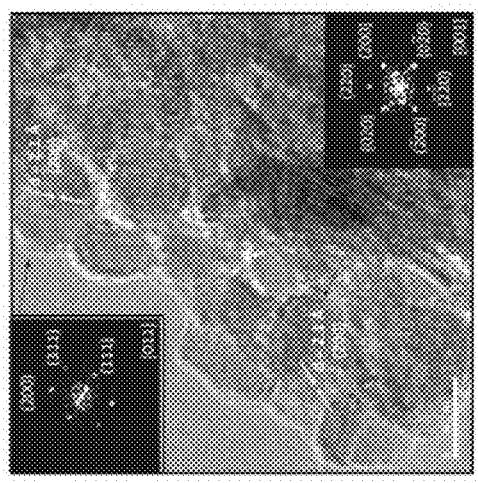
FIG. 26D is an HRTEM image for α-Mo$_2$C prepared by the SSM method with MgMoO$_4$.

After 3 hours at 800° C. all precursors (AHM, AMM, and MgMoO$_4$) yielded β-Mo$_2$N, whereas the γ-phase was formed preferentially with the use of shorter heating rates during the in situ synthesis. The average domain size, 43 nm, 28 nm, and 29 nm respectively, are significantly greater than that of the γ-phase nitrides produced from the in situ studies. The bulk synthesis was repeated with samples prepared by the sacrificial support method (SSM) and the results are shown in FIG. 25.

AHM supported on MgO produced predominantly β-Mo$_2$N and Mg$_2$Mo$_3$O$_8$ (75 wt % and 20 wt %) with residual amounts of Mo metal. However, complete conversion of AMM to a mixture of γ- and β-Mo$_2$N (46 wt % and 53 wt %) was obtained. The sample prepared from MgMoO$_4$ supported on MgO produced a mixture of of γ- and β-Mo$_2$N, with the dominant phase being γ-Mo$_2$N, 67 wt %. The average domain sizes shown are the weighted average of the constituent nitride phases.

Carbide samples prepared by the SSM method produced the cubic phase, α-Mo$_2$C, at 700° C. The average domain size for the carbides synthesized from AHM, AMM, and MgMoO$_4$ were all on the order of 5 nm (Table 1).

Table 1 summarizes the results of XRD pattern refinements and BET surface area of all Mo2N phases and α-Mo2C samples prepared by the SSM method.

TABLE 1

Summary of XRD data showing: phase composition (α, γ, and β), average domain size ($D_{avg}$), BET surface area ($S_{BET}$), and unit cell parameters (a, b, and c), for Mo$_2$N and α-Mo$_2$C prepared by bulk and SSM methods.

| Mo$_2$N | γ, β (wt %) | $D_{avg}$ (nm) | $S_{BET}$ (m$^2$g$^{-1}$) | a (Å) β, γ | b (Å) β, γ | c (Å) β, γ |
|---|---|---|---|---|---|---|
| AHM - Bulk | 0, 100 | 43.1 | 3 | 4.20 | 4.20 | 8.03 |
| AMM - Bulk | 0, 100 | 27.2 | 31 | 4.20 | 4.20 | 8.03 |
| MgMoO$_4$ - Bulk | 0, 100 | 29.1 | 30 | 4.20 | 4.20 | 8.01 |
| AHM - SSM | 0, 75 | 12.8 | 56 | 4.20 | 4.20 | 8.05 |
| AMM - SSM | 46, 54 | 14.1 | 56 | 4.19 | 4.19 | 8.03 |
| | | | | 4.14 | 4.14 | 4.14 |
| MgMoO$_4$ - SSM | 69, 31 | 7.8 | 116 | 4.21 | 4.21 | 8.07 |
| | | | | 4.21 | 4.21 | 4.21 |
| α-Mo$_2$C | — | — | — | — | — | — |
| AHM - SSM | — | 5.8 | 73 | 4.27 | 4.27 | 4.27 |
| AMM - SSM | — | 5.5 | 105 | 4.25 | 4.25 | 4.25 |
| MgMoO$_4$ - SSM | — | 5.1 | 120 | 4.25 | 4.25 | 4.25 |

Transmission Electron Microscopy (TEM)

Figure 27A:
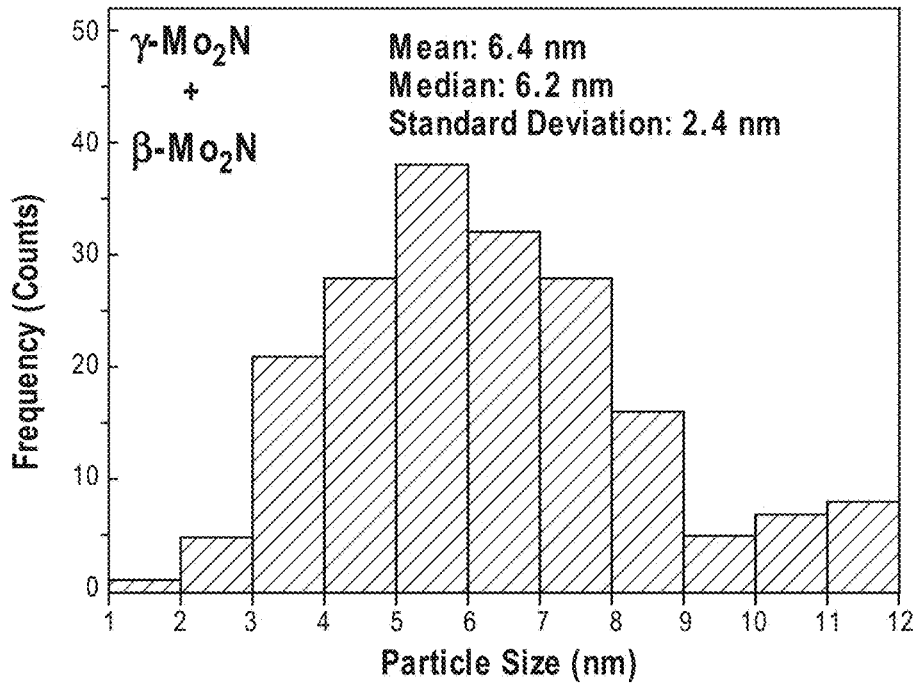
FIG. 27A shows a PSD from HRTEM data for Mo$_2$N prepared by the SSM method with MgMoO$_4$.
Figure 27B:
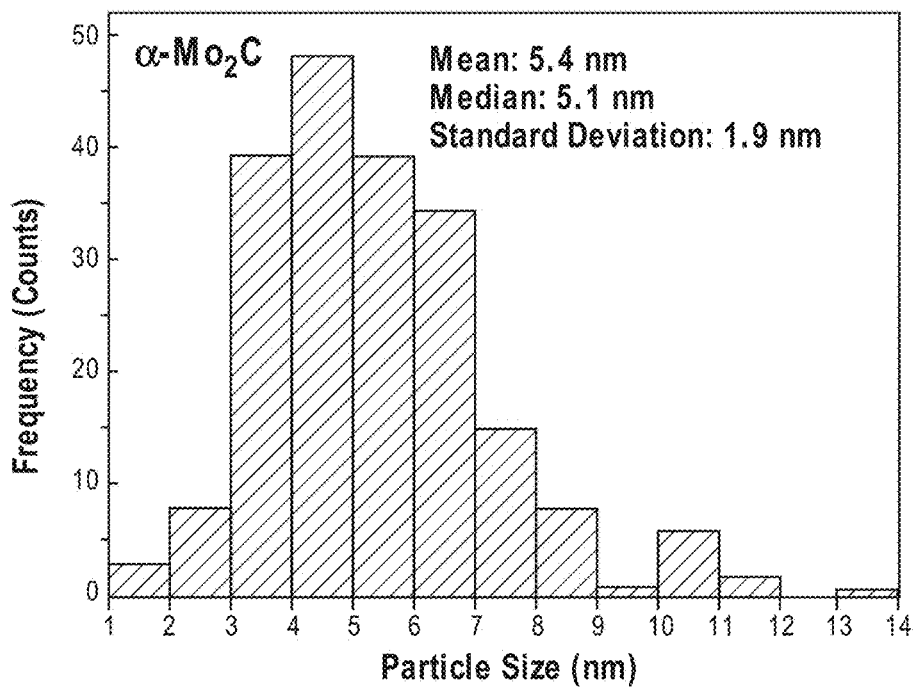
FIG. 27B shows a PSD from HRTEM data for α-Mo$_2$C prepared by the SSM method with MgMoO$_4$.

Particle size distributions (PSD) were generated from TEM data for Mo$_2$C and Mo$_2$N prepared by the SSM method with MgMoO$_4$. FIG. 26A-D show TEM images and FIG. 27A-B the corresponding PSD's for samples prepared by the SSM method using MgMoO$_4$.

The average particle sizes measured for α-Mo$_2$C (5.4 nm) was in strong agreement with the average domain size calculated by XRD pattern refinement, suggesting single crystal particles.

However, the average particle size found in the Mo$_2$N sample was slightly less than the average domain size calculated by XRD. This result likely stems from the difficulty in deconvoluting overlapping reflections in the XRD patterns for γ- and β-Mo$_2$N. This would suggest a larger mass fraction of the γ-Mo$_2$N than what was calculated from XRD pattern refinement. High resolution TEM images (HR-TEM) were also obtained to index specific lattice planes, confirming the PSD's are that of γ-Mo$_2$N, β-Mo$_2$N, and α-Mo$_2$C respectively.

Figure 28:
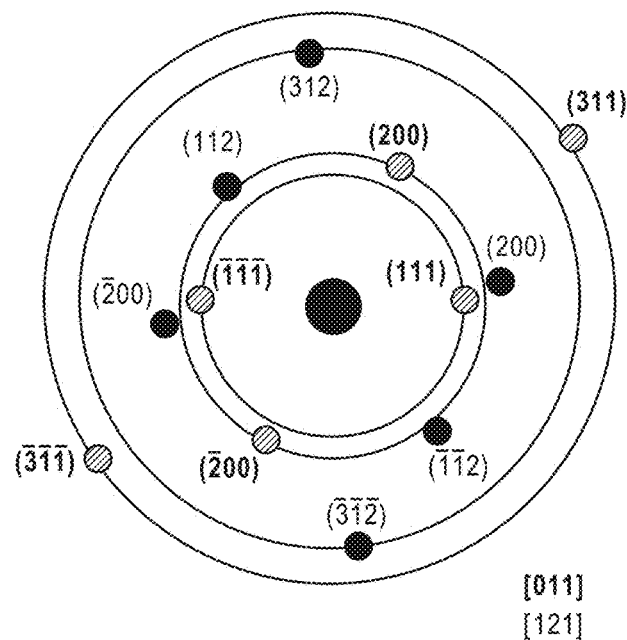
FIG. 28 shows an indexed FFT pattern obtained from Mo$_2$N prepared from the SSM method with MgMoO$_4$ showing Red) γ-Mo$_2$N and Black) β-Mo$_2$N.
Figure 29A:
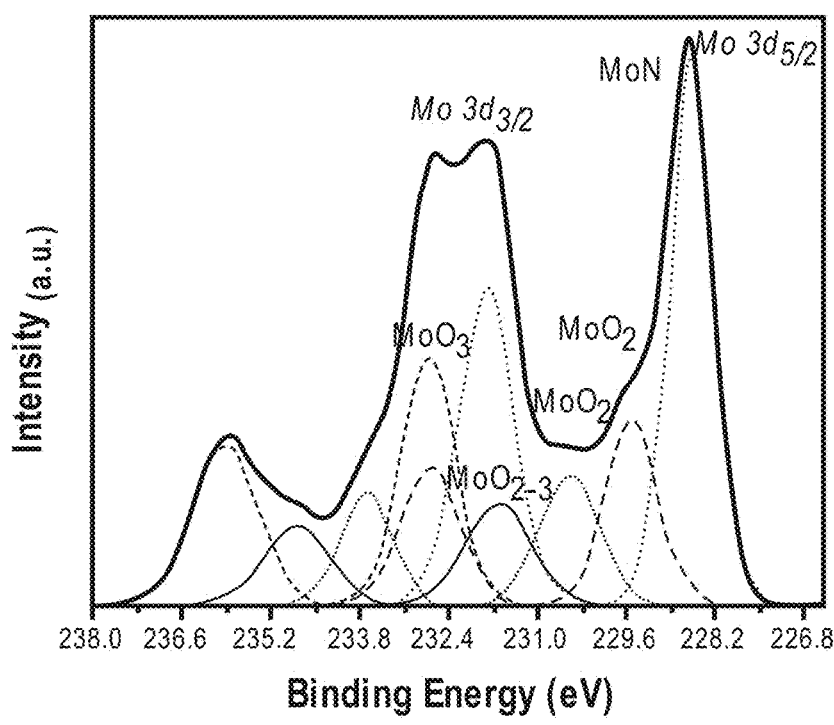
FIG. 29A shows XPS spectra for Mo$_2$N prepared by the SSM method with MgMoO$_4$ showing Mo 3d spectra with the N 1s and 2s spectra. Black curve shows the sum of the individual spectra fitted to the experimental data.
Figure 29B:
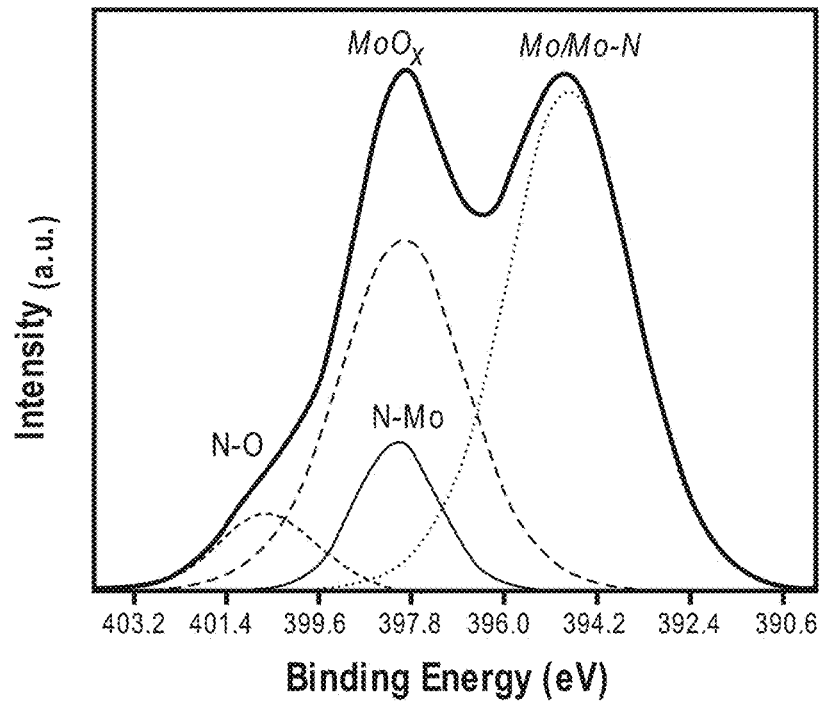
FIG. 29B shows XPS spectra for Mo$_2$N prepared by the SSM method with MgMoO$_4$ showing Mo 3p spectra with the N is and 2s spectra. Black curve shows the sum of the individual spectra fitted to the experimental data.

The FFT pattern for Mo$_2$N, FIG. 28 (upper right) shows the family of (200) planes corresponding to γ-Mo$_2$N. The FFT pattern on the lower right consist of both γ- and β-Mo$_2$N and the pattern is indexed in FIGS. 29A and B.

X-Ray Photoectron Spectrscopy (XPS)

Figure 30:
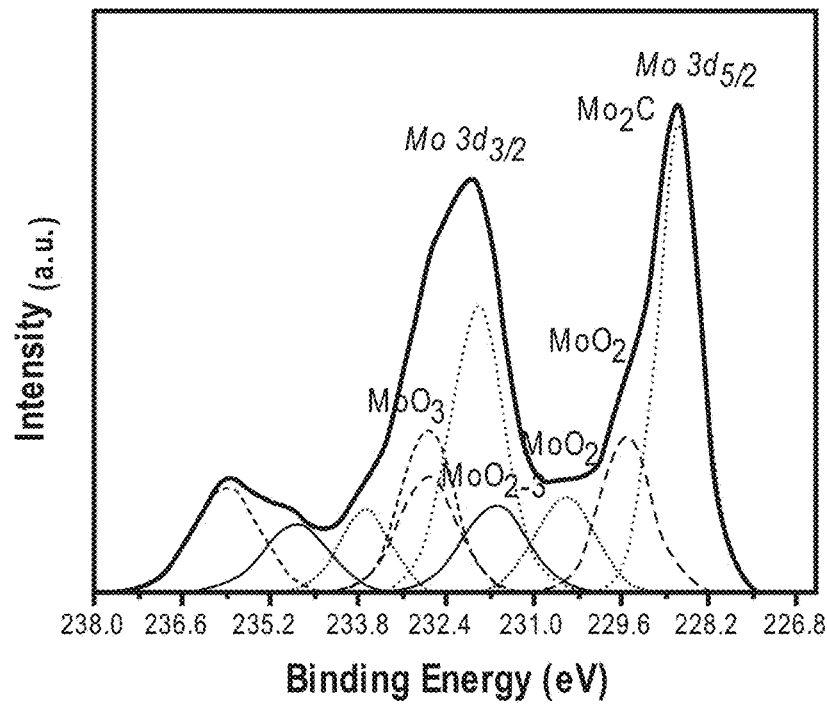
FIG. 30 shows XPS spectra for α-Mo$_2$C prepared by the SSM method with MgMoO$_4$ showing the Mp 3d spectra. Black curve shows the sum of the individual spectra fitted to the experimental data.

As Mo$_2$C and Mo$_2$N are widely considered to be oxycarbides and oxynitrides [15,18] where O can occupy interstitial C or N sites in the lattice, XPS analysis was used to quantify total molybdenum, oxygen, nitrogen, and carbon content. For the samples prepared by the SSM method with MgMoO$_4$, the Mo 3d and Mo 3p spectra were analyzed, including the N 1s spectra that appear in the region of the Mo 3p spectrum. The Mo 3d spectra (FIG. 30) consists primarily of Mo$_2$N (peak at 228.6 eV) and Mo$^{iv}$ and Mo$^{vi}$ states within a higher binding energy range of 229.5-232 eVs. These mixed Mo valencies were referenced to various Mo-oxide phases: MoO$_2$, MoO$_3$, and a nonstoichiometric oxide compound where the O:Mo ratio is approximately 2.5. From the integrated intensities, the stoichiometric ratios of N:Mo and O:Mo were calculated and are 0.49 and 1.19 respectively. The large amount of oxygen suggests that MoO$_x$ is present in bulk, however the absence of bulk oxide in XRD, as well as no amorphous surface layers observed in HRTEM, suggest the oxide is interstitial in the nitride lattice. From analysis of the Mo 3p and N 1s spectra (FIG. 10.B), the N:Mo and O:Mo ratios were found to be 0.69 and 0.76 respectively. Here, the N is signal can be observed from up to 10 nm in depth, where the Mo signal for both 3p and 3d are from approximately <5 nm. Two conclusions can be made: given the average particle size of 6.4 nm, the bulk composition calculated by XPS spectra suggests the $Mo_2N$ sample should be considered as an oxynitride rather than a pure nitride, and the near surface composition contains more oxide than the bulk. This result is consistent with a passivation layer of oxide resulting from the pyrophoric nature of $Mo_2N$.

What is claimed is:

1. A highly dispersed heterogenous material comprising an active support formed from a nanocrystalline ceramic material decorated with platinum (Pt) or a platinum group metal (PGM) in the form of molecules, clusters, nanoparticles or a combination thereof and further comprising an intermetallic phase formed from the nanocrystalling ceramic material and the Pt or PGM.

2. The material of claim 1 wherein the nanocrystalline ceramic material comprises Molybdenum (Mo).

3. The material of claim 2 further comprising a ternary Pt—Mo—C phase.

4. The material of claim 2 wherein the intermetallic phase comprises $PtMo_z$.

5. The material of claim 1 wherein the the platinum or platinum group metal is inactive for catalytic activity.

6. The material of claim 1 wherein the platinum or platinum group metal is catalytically active.

7. The material of claim 1 wherein the active support is porous.

8. The material of claim 7 wherein the active support comprises irregularly sized voids.

9. The material of claim 1, wherein the material is in the form of particles between 2 and 1000 nm in diameter.

10. The material of claim 9 wherein the material has a surface area of between 10 and 250 $m^2/g$.

11. The material of claim 9 wherein the particles are between 15 and 30 nm in diameter.

12. The material of claim 11 wherein the material has a surface area of between ~35 $m^2/g$-~45 $m^2/g$.

13. The material of claim 1 with a platinum loading of at least 7 wt %.

14. The material of claim 13 with a platinum loading of between 7 and 8 wt %.

15. The material of claim 14 with an electrochemical surface area of approximately 36 $m^2/g$.

16. The material of claim 14 with a platinum mass activity of 137 $A/g_{pt}$.

17. The material of claim 13 with a platinum mass activity of 137 $A/g_{pt}$.

* * * * *